United States Patent
Ohfuji et al.

(10) Patent No.: US 10,072,143 B2
(45) Date of Patent: Sep. 11, 2018

(54) AQUEOUS POLYOLEFIN RESIN DISPERSION

(71) Applicant: UNITIKA LTD., Hyogo (JP)

(72) Inventors: Haruki Ohfuji, Kyoto (JP); Nobuyasu Okumura, Kyoto (JP); Takuma Yano, Kyoto (JP); Kenjin Shiba, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 15/032,366

(22) PCT Filed: Dec. 3, 2014

(86) PCT No.: PCT/JP2014/081929
§ 371 (c)(1),
(2) Date: Apr. 27, 2016

(87) PCT Pub. No.: WO2015/083721
PCT Pub. Date: Jun. 11, 2015

(65) Prior Publication Data
US 2016/0280901 A1    Sep. 29, 2016

(30) Foreign Application Priority Data

Dec. 4, 2013   (JP) .................................. 2013-250672
May 21, 2014   (JP) .................................. 2014-104797

(51) Int. Cl.
| | |
|---|---|
| C08L 23/26 | (2006.01) |
| C08L 75/04 | (2006.01) |
| C08J 3/05 | (2006.01) |
| C09D 5/02 | (2006.01) |
| C09D 123/26 | (2006.01) |
| C09J 123/16 | (2006.01) |
| C09J 123/26 | (2006.01) |

(52) U.S. Cl.
CPC ............ *C08L 23/26* (2013.01); *C08J 3/05* (2013.01); *C08L 75/04* (2013.01); *C09D 5/022* (2013.01); *C09D 123/26* (2013.01); *C09J 123/26* (2013.01); C08J 2323/16 (2013.01); C08L 2201/50 (2013.01)

(58) Field of Classification Search
CPC ...... C08L 23/26; C08L 75/04; C08L 2201/50; C08J 3/05; C08J 2323/16; C09D 5/022; C09D 123/26; C09J 123/16
USPC ....................................................... 524/507
See application file for complete search history.

(56) References Cited

U.S. PATENT DOCUMENTS

| | | | |
|---|---|---|---|
| 2003/0187128 A1 | 10/2003 | Shiba et al. | |
| 2005/0203242 A1 | 9/2005 | Nakayama et al. | |
| 2007/0037923 A1* | 2/2007 | Shiba | B32B 27/08 524/556 |
| 2009/0092847 A1* | 4/2009 | Onoe | B32B 27/08 428/500 |

FOREIGN PATENT DOCUMENTS

| | | |
|---|---|---|
| CN | 1464894 | 12/2003 |
| CN | 1646624 | 7/2005 |
| CN | 1791634 | 6/2006 |
| CN | 101384645 | 3/2009 |
| JP | 2-58586 | 2/1990 |
| JP | 5-279431 | 10/1993 |
| JP | 2005-239812 | 9/2005 |
| JP | 2007-270122 | 10/2007 |
| JP | 2014-133411 | 7/2014 |
| WO | 2004/104090 | 12/2004 |

OTHER PUBLICATIONS

International Search Report in corresponding PCT application PCT/JP2014/081929.
English language machine translation of JP 2-58586.
English language machine translation of JP 5-279431.
English language machine translation of JP 2005-239812.
English language machine translation of JP 2014-133411.
Office Action in corresponding Taiwanese application 103142119.
Office Action in corresponding Chinese patent application No. 201480062616.X, dated Jan. 30, 2018.
English language translation of Office Action in corresponding Chinese patent application No. 201480062616.X, dated Jan. 30, 2018.

* cited by examiner

*Primary Examiner* — Ling Siu Choi
*Assistant Examiner* — Ronald Grinsted
(74) *Attorney, Agent, or Firm* — Fildes & Outland, P.C.

(57) ABSTRACT

Disclosed is an aqueous polyolefin resin dispersion including a polyolefin resin and an aqueous medium, wherein the polyolefin resin includes an olefin component and an unsaturated carboxylic acid component as copolymer components; the olefin component includes propylene (A) and an olefin(s) (B) other than propylene; the mass ratio (A/B) between the propylene (A) and the olefin(s) (B) other than propylene is 60/40 to 95/5; the content of the unsaturated carboxylic acid component as the copolymer component is 1 part by mass or more in relation to 100 parts by mass of the total mass of (A) and (B); and the content of the unsaturated carboxylic acid monomer in the dry residue of the aqueous dispersion is 10,000 ppm or less.

12 Claims, No Drawings

AQUEOUS POLYOLEFIN RESIN DISPERSION

TECHNICAL FIELD

The present invention relates to an aqueous dispersion that includes a polyolefin resin and is suitable as a binder component in, for example, a coating agent, a primer, a coating material, an ink and an adhesive.

BACKGROUND ART

A polyolefin resin such as a polypropylene resin is excellent in electric properties, mechanical properties, chemical properties, formativeness, hygienic property and recyclability, and accordingly is used mainly for automobiles, electric appliances, packaging materials, daily miscellaneous goods and the like. However, in general, the polyolefin resin has no polar group in the molecular chain thereof, and therefore, unfortunately, it is difficult to apply a coating material or the like to the polyolefin resin or to allow the polyolefin resin to adhere with an adhesive.

Accordingly, it is proposed to use a chlorinated polyolefin resin as a binder component of a coating material or an adhesive when a coating material is applied to a polyolefin resin such as a polypropylene resin, or when a polyolefin resin such as a polypropylene resin is allowed to adhere with an adhesive. However, a chlorinated polyolefin resin generates a harmful substance such as an acidic gas when the chlorinated polyolefin resin is discarded by incineration, and hence, recently a transition to a non-chlorine-based binder resin has been strongly demanded as the environmental concern grows.

In packaging materials, a polyolefin resin is used as, for example, a sealant resin, in such a way that there is used a laminated body obtained by laminating the sealant resin prepared from a polyolefin resin on a substrate.

As a method for producing a laminated body having such a configuration, for example, the following methods have been adopted: a dry lamination method in which an adhesive layer is provided on a substrate, and then a sealant resin film beforehand formed in a film form is bonded to the adhesive layer while the sealant resin film is being pressurized with a heating roll to form a sealant layer; and an extrusion lamination method in which an adhesive layer is provided on a substrate, and then a molten sealant resin is extruded from an extruder on the adhesive layer to form a sealant layer.

The extrusion lamination method has, for example, an advantage such that a sealant resin is not required to be beforehand formed in a film, or an advantage such that even when the adhesive layer is thin, a sufficient adhesive strength is obtained, and hence is suitable for a mass production of laminated bodies at a low cost. The extrusion lamination method using a polyethylene resin as a sealant resin has been widely used.

However, in the adhesion between a substrate and a polypropylene resin, no adhesive having a practical adhesive strength has been available in the extrusion lamination method, and accordingly, when a laminated body is produced by using a polypropylene resin as a sealant layer, the dry lamination method large in number of steps and high in cost has been exclusively adopted.

Examples of the method for providing an adhesive layer on a substrate as described above include a method in which a resin is converted into a state of being a liquid material and the liquid material is applied. For the purpose of converting a resin into a liquid material, for example, the following methods are used: (a) a method in which a resin is used in a molten state; (b) a method in which a resin is used as dissolved or dispersed in an organic solvent; and (c) a method in which a resin is used as dispersed in an aqueous medium. However, the method of (a) is unfortunately limited in applications, or unfortunately finds difficulty in forming a thin film depending on the balance with the melt viscosity of the resin. Accordingly, although the methods of (b) and (c) are generally understood to be preferable, nowadays, the use of organic solvents tends to be restricted from the viewpoints of environmental protection, resources saving, hazardous materials regulation due to the Fire Services Act or the like, and workplace environment improvement, and thus, the method of (c), namely the method in which a resin is used as dispersed in an aqueous medium is regarded as most preferable.

When an aqueous dispersion is prepared from a resin, a surfactant is generally used in order to promote the dispersion of the resin. However, in general, a surfactant is nonvolatile, and even when a coating film obtained from an aqueous dispersion prepared from a resin is dried, the surfactant remains in the coating film; consequently, when an amount used of a surfactant is large, unfortunately the water resistance or the chemical resistance of the coating film is remarkably degraded, the tendency for the surfactant to bleed out from the coating film is enhanced to be unfavorable from environmental and hygienic points of view, and moreover, the performances of the coating film are also liable to be varied with time.

From such a background as described above, the development of modified polyolefin resins obtained by modifying the polyolefin resins with acids or the like, as nonchlorine-based binder resins, has been performed, and the preparation of an aqueous dispersion of an acid-modified polyolefin resin without using any surfactant has been investigated. For example, Patent Literature 1 discloses a technique for obtaining an aqueous acid-modified polyolefin resin dispersion substantially without using any surfactant.

CITATION LIST

Patent Literature

Patent Literature 1: International Publication No. 2004/104090

SUMMARY OF INVENTION

Technical Problem

However, in the aqueous acid-modified polyolefin resin dispersion disclosed in Patent Literature 1, no surfactant is used, accordingly the weight average particle size of the resin particles in the aqueous dispersion is sometimes relatively large, the film formability at a low temperature is sometimes poor, and the obtained coating film is sometimes poor in water resistance, chemical resistance and moist heat resistance, leaving room for improvement.

The present invention eliminates such drawbacks of the conventional techniques, and takes as its technical problem to provide an aqueous dispersion finely and stably including fine particles of a polyolefin resin having a specific composition in an aqueous medium even without using any nonvolatile aqueous dispersing aid, wherein the aqueous dispersion is capable of forming a coating film excellent in required capabilities such as the adhesiveness to a polyolefin resin, water resistance, chemical resistance and moist heat resistance as the binder components for the coating agents, primers, coating materials, inks, adhesives and the like for polyolefin resins mainly used in automobiles, electric appliances, packaging materials, daily miscellaneous goods and the like.

Solution to Problem

The present inventors made a diligent study in order to solve the foregoing technical problem, and consequently have reached the present invention by discovering that the foregoing technical problem can be solved by using as an acid-modified polyolefin resin having a specific constitution and also by setting the monomer content of the acid-modified component in the aqueous dispersion to be a specific content or less.

Specifically, the gist of the present invention is as follows.

(1) An aqueous polyolefin resin dispersion including a polyolefin resin and an aqueous medium, wherein the polyolefin resin includes an olefin component and an unsaturated carboxylic acid component as copolymer components; the olefin component includes propylene (A) and an olefin(s) (B) other than propylene; the mass ratio (A/B) between the propylene (A) and the olefin(s) (B) other than propylene is 60/40 to 95/5; the content of the unsaturated carboxylic acid component as the copolymer component is 1 part by mass or more in relation to 100 parts by mass of the total mass of the propylene (A) and the olefin(s) (B) other than propylene; and the content of the unsaturated carboxylic acid monomer in the dry residue of the aqueous dispersion is 10,000 ppm or less.

(2) The aqueous polyolefin resin dispersion according to (1), wherein the olefin(s) (B) other than propylene is butene.

(3) The aqueous polyolefin resin dispersion according to (1) or (2), further including a cross-linking agent and/or a polyurethane resin.

(4) An aqueous dispersion-containing material selected from a coating agent, a primer, a coating material, an ink and an adhesive, wherein the aqueous dispersion-containing material includes the aqueous polyolefin resin dispersion according to any one of (1) to (3).

(5) A coating film obtained from the aqueous polyolefin resin dispersion according to any one of (1) to (3).

Advantageous Effects of Invention

The polyolefin resin included in the aqueous dispersion of the present invention includes propylene and an olefin(s) other than propylene as the olefin components and an unsaturated carboxylic acid component as an acid modifying component in a specific amount or more, and the content of the unsaturated carboxylic acid monomer in the dry residue of the aqueous dispersion is a specific content or less; thus, the olefin resin can display an extremely fine dispersion state in the aqueous medium. The aqueous dispersion is excellent in low-temperature film formability, and allows a coating film excellent in the adhesiveness to a polyolefin substrate to be obtained even when the applied aqueous dispersion is dried during film formation at a lower temperature and in a shorter time than conventional ones; the obtained coating film includes no nonvolatile aqueous dispersing aid, accordingly is not impaired with respect to the intrinsic properties of the polyolefin resin, and is excellent in the adhesiveness to the substrate, water resistance, chemical resistance and moist heat resistance. A coating film obtained from an aqueous dispersion further including a cross-linking agent and/or a polyurethane resin, in addition to the polyolefin resin, is remarkably excellent in chemical resistance and moist heat resistance. The aqueous dispersion of the present invention can also be utilized as an excellent adhesive for use in extrusion lamination of a polypropylene resin.

The aqueous dispersion of the present invention is excellent in the mixing stability with various materials such as inorganic particles, and is suitable for use as binders for, for example, various coating agents, primers, coating materials, inks and adhesives. In particular, an aqueous dispersion having a weight average particle size of the polyolefin resin of 0.05 μm or less is remarkably high in the effect of the addition of an additive and in transparency, to be particularly suitable for the above-described uses.

Moreover, the use of a polyolefin resin provided with the above-described constitution as the polyolefin resin allows such aqueous dispersions to be stably produced at low costs.

DESCRIPTION OF EMBODIMENTS

Hereinafter, the present invention is described in detail.

The aqueous polyolefin resin dispersion of the present invention includes a polyolefin resin and an aqueous medium.

<Polyolefin Resin>

First, the polyolefin resin is described.

The polyolefin resin of the present invention includes an olefin component and an unsaturated carboxylic acid component as copolymerization components, and the olefin component include propylene (A) and an olefin(s) (B) other than propylene.

In the present invention, the mass ratio (A/B) between the propylene (A) and the olefin(s) (B) other than propylene is required to be 60/40 to 95/5 and is preferably 60/40 to 80/20, from the viewpoint of making small the dispersed particle size of the polyolefin resin, and when the below-described aqueous dispersion is prepared, and from the viewpoint of improving the adhesiveness of the coating film to the polypropylene substrate (hereinafter, sometimes referred to as the PP substrate). When the proportion of the propylene (A) is less than 60% by mass, the adhesiveness to the PP substrate is degraded, and on the other hand, when the proportion of the propylene (A) exceeds 95% by mass, the dispersed particle size of the polyolefin resin is large, and the preparation of an aqueous dispersion of the resin is sometimes difficult.

Examples of the olefin(s) (B) other than propylene include: alkenes such as ethylene, 1-butene, isobutene, 1-pentene, 4-methyl-1-pentene, 3-methyl-1-pentene, 1-hexene, 1-octene and norbornene; and dienes such as butadiene and isoprene. Among these, the olefin(s) (B) other than propylene is preferably butene (1-butene, isobutene, and the like) from the viewpoint of the easiness in producing the polyolefin resin, the easiness in preparing an aqueous dispersion, the adhesiveness to various materials, in particular, the adhesiveness to the PP substrate, the blocking property and the like.

The content of ethylene as the olefin(s) (B) other than propylene is preferably 10% by mass or less and more preferably 5% by mass or less, and it is furthermore preferable not to include ethylene as the olefin other than propylene. In general, in the case where the polyolefin resin includes ethylene, when the unsaturated carboxylic acid component is copolymerized by the below-described method, a cross-linking reaction is known to occur competitively. When the cross-linking reaction proceeds, the molecular weight increase sometimes occurs in the polyolefin resin obtained by acid modification to degrade the operability of the acid modification. When the cross-linking reaction proceeds, the increase of the particle size sometimes occurs in the polyolefin resin in the aqueous dispersion, and moreover, depending on the content of ethylene, the preparation of the aqueous dispersion of the polyolefin resin is sometimes made difficult. Accordingly, in the aqueous dispersion of the present invention, it is preferable to constitute the olefin component of the olefin resin with an olefin other than ethylene.

In the polyolefin resin, examples of the polymerization form of each component include, without being limited to: random copolymerization, block copolymerization and graft copolymerization; from the viewpoint of the easiness in polymerization, the polyolefin resin preferably undergoes random copolymerization. If necessary, a plurality of types of polyolefin resins may also be used as mixed.

The polyolefin resin in the present invention is a resin including the olefin components and the unsaturated carboxylic acid component as the polymerization components. The content of the unsaturated carboxylic acid component as a copolymerization component is required to be 1 part by mass or more, and is preferably 1 to 15 parts by mass, more preferably 1 to 10 parts by mass, furthermore preferably 1 to 8 parts by mass and most preferably 1.5 to 7 parts by mass, in relation to 100 parts by mass of the total mass (A+B) of the propylene (A) and the olefin(s) (B) other than propylene. When the content of the unsaturated carboxylic acid component is less than 1 part by mass, it is difficult to prepare an aqueous dispersion of the polyolefin resin, and usually when the content of the unsaturated carboxylic acid component exceeds 15 parts by mass, the preparation of an aqueous dispersion of the resin is easy, but the adhesiveness to the PP substrate is sometimes degraded.

In the aqueous polyolefin resin dispersion of the present invention, as described below, the content of the unsaturated carboxylic acid monomer in the dry residue of the aqueous dispersion is required to be 10,000 ppm or less. Usually, when the unsaturated carboxylic acid component is introduced into the unmodified polyolefin resin by the below-described method, the unreacted unsaturated carboxylic acid monomer remains in the polyolefin resin. In addition, when the content of the unsaturated carboxylic acid component as the copolymerization component in the polyolefin resin is large, the unreacted unsaturated carboxylic acid monomer tends to remain in a large amount.

When an aqueous dispersion is continuously produced by using a polyolefin resin having a content of the unsaturated carboxylic acid monomer exceeding 10,000 ppm, with the increase of the number of production times, the weight average particle size of the resin in the aqueous dispersion is sometimes increased, or the viscosity of the aqueous dispersion is sometimes increased. A coating film obtained from the aqueous dispersion including a polyolefin resin having a content of the unsaturated carboxylic acid monomer exceeding 10,000 ppm is sometimes poor in water resistance, chemical resistance and moist heat resistance.

According to the present inventors, it has been verified that the content of the unsaturated carboxylic acid monomer in the dry residue of an aqueous dispersion including only the polyolefin resin as the solid component thereof coincides with the content of the unsaturated carboxylic acid monomer measured in the polyolefin resin raw material before the preparation of the aqueous dispersion of the polyolefin resin.

Accordingly, it is preferable to use a polyolefin resin having a content of the unsaturated carboxylic acid monomer of 10,000 ppm or less as the polyolefin resin constituting the aqueous polyolefin resin dispersion. When the suppression of the increase of the weight average particle size of the polyolefin resin or the suppression of the viscosity increase of the aqueous dispersion during a continuous production of the aqueous dispersion, and additionally water resistance, chemical resistance and moist heat resistance of the coating film obtained from the aqueous dispersion are demanded, the content of the unsaturated carboxylic acid monomer in the polyolefin resin is more preferably 5,000 ppm or less, furthermore preferably 1,000 ppm or less, particularly preferably 500 ppm or less and most preferably 100 ppm or less.

Examples of the method for reducing the content of the unsaturated carboxylic acid monomer in the polyolefin resin include, without being particularly limited to: a method distilling off under reduced pressure from the polyolefin resin; a method separating by dissolving the polyolefin resin in a solvent followed by reprecipitation; a method washing the polyolefin resin converted into a powder or a pellet in water or an organic solvent; and a method reducing by the Soxhlet extraction method. Among these, from the viewpoint of the operability or the reduction efficiency, the following methods are preferable: a method distilling off under reduced pressure from the polyolefin resin; a method separating by dissolving the polyolefin resin in a solvent followed by reprecipitation; and a method washing the polyolefin resin converted into a powder or a pellet in water or an organic solvent.

As the method for quantitatively determining the unsaturated carboxylic acid monomer in the polyolefin resin, heretofore known methods can be used. In an example of such a method, the unsaturated carboxylic acid monomer is extracted from the resin with an extraction solvent such as water, acetone, MEK, methanol or ethanol, and can be quantitatively determined by using, for example, liquid chromatography or gas chromatography. When the acid anhydride of the unsaturated carboxylic acid monomer is quantitatively determined, the acid anhydride may also be quantitatively determined as the unsaturated carboxylic acid monomer corresponding to the acid anhydride by performing hydrolysis of the acid anhydride.

As the unsaturated carboxylic acid component, in addition to the unsaturated carboxylic acids such as acrylic acid, methacrylic acid, maleic acid, maleic anhydride, itaconic acid, itaconic anhydride, aconitic acid, aconitic anhydride, fumaric acid, crotonic acid, citraconic acid, mesaconic acid and allylsuccinic acid, there can also be used compounds each having at least one carboxyl group or one acid anhydride group in the molecule thereof (within the monomer unit) such as half esters or half amides of unsaturated carboxylic acids. Among these, because of the easiness in introducing into the polyolefin resin (hereinafter, referred to as the unmodified polyolefin resin) including the propylene (A) and the olefin(s) (B) other than propylene, maleic anhydride, acrylic acid and methacrylic acid are preferable, and maleic anhydride is more preferable.

Accordingly, in the present invention, as described above, butene is suitable as the olefin(s) (B) other than propylene, and hence it is preferable to use a propylene/butene/maleic anhydride ternary copolymer as the polyolefin resin.

The unsaturated carboxylic acid component is only required to be copolymerized in the polyolefin resin, without being limited in the form of the copolymerization. Examples of the copolymerization form include random copolymerization, block copolymerization, and graft polymerization.

It is to be noted that the acid anhydride component introduced into the polyolefin resin tends to take an acid anhydride structure; in the below-described aqueous medium including a basic compound, the acid anhydride component concerned undergoes ring-opening partially or wholly, and tends to be a carboxylic acid or a salt thereof.

Examples of the method for introducing the unsaturated carboxylic acid component into the unmodified polyolefin resin include, without particularly limited to, a method for graft polymerizing the unsaturated carboxylic acid component with the unmodified polyolefin resin, by adopting, for example, one of the following methods: a method in which in the presence of a radical generator, the unmodified polyolefin resin and the unsaturated carboxylic acid component are melted by heating to a temperature equal to or higher than the melting point of the unmodified polyolefin resin and thus are allowed to react with each other; and a method in which the unmodified polyolefin resin and the unsaturated carboxylic acid component are dissolved in an organic solvent, and then are heated and stirred, and thus are allowed to react with each other in the presence of a radical generator.

Examples of the radical generator used in the graft polymerization include: organic peroxides such as di-tert-butyl peroxide, dicumyl peroxide, tert-butyl hydroperoxide, tert-butyl cumyl peroxide, benzoyl peroxide, dilauryl peroxide, cumene hydroperoxide, tert-butylperoxy benzoate, ethyl ethyl ketone peroxide and di-tert-butyl diperphthalate; and azo compounds such as azobisisobutyronitrile. These may be used by appropriately selecting according to the reaction temperature.

In the polyolefin resin of the present invention, if necessary, other components other than the above-described components may be included. Examples of the other components include: (meth)acrylic acid esters such as methyl (meth)acrylate, ethyl (meth)acrylate and butyl (meth)acrylate; maleic acid esters such as dimethyl maleate, diethyl maleate and dibutyl maleate; (meth)acrylic acid amides; alkyl vinyl ethers such as methyl vinyl ether and ethyl vinyl ether; vinyl esters such as vinyl formate, vinyl acetate, vinyl propionate, vinyl pivalate and vinyl versatate, and vinyl alcohols obtained by saponifying the vinyl esters with a basic compound or the like; and 2-hydroxyethyl acrylate, glycidyl (meth)acrylate, (meth)acrylonitrile, styrene, substituted styrene, vinyl halides, vinylidene halides, carbon monoxide and sulfur dioxide, and mixtures of these may also be used.

In general, the content of these other components is preferably 10% by mass or less of the polyolefin resin.

In the polyolefin resin of the present invention, the weight average molecular weight is preferably 5,000 to 200,000, more preferably 10,000 to 150,000, furthermore preferably 20,000 to 120,000, particularly preferably 30,000 to 100,000 and most preferably 35,000 to 80,000. When the weight average molecular weight of the polyolefin resin is less than 5,000, the adhesiveness to the substrate sometimes tends to be degraded, or the obtained coating film tends to be hard and brittle, and on the other hand, when the weight average molecular weight of the polyolefin resin exceeds 200,000, the preparation of the aqueous dispersion of the resin tends to be difficult. It is to be noted that the weight average molecular weight of the resin can be determined by using gel permeation chromatography (GPC) relative to polystyrene resin standards.

In general, the polyolefin resin is sparingly soluble in solvents, and accordingly, sometimes the measurement of the molecular weight of the polyolefin resin is difficult. In such a case, it is recommended to adopt, as a measure of the molecular weight, the melt flow rate value indicating the fluidity of the molten resin.

<Aqueous Medium>

The aqueous polyolefin resin dispersion of the present invention includes the above-described polyolefin resin and the above described aqueous medium, wherein the polyolefin resin is dispersed or dissolved in the aqueous medium. In the present invention, an aqueous medium is a liquid mainly composed of water, and may also contain a below-described organic solvent(s) or a below-described basic compound(s).

Examples of the basic compound include: ammonia, triethylamine, N,N-dimethylethanolamine, isopropylamine, aminoethanol, dimethylaminoethanol, diethylaminoethanol, ethylamine, diethylamine, isobutylamine, dipropylamine, 3-ethoxypropylamine, 3-diethylaminopropylamine, sec-butylamine, propylamine, n-butylamine, 2-methoxyethylamine, 3-methoxypropylamine, 2,2-dimethoxyethylamine, monoethanolamine, morpholine, N-methylmorpholine, N-ethylmorpholine, pyrrole and pyridine. The mixing amount of the basic compound is preferably 0.5 to 10 times, more preferably 0.8 to 5 times and particularly preferably 0.9 to 3.0 times the number of equivalents of the carboxyl group in the polyolefin resin. When the mixing amount of the basic compound is less than 0.5 times the number of equivalents of the carboxyl group, the effect of the addition of the basic compound is not found, and when the mixing amount of the basic compound exceeds 10 times the number of equivalents of the carboxyl group, the drying time during the formation of the coating film is sometimes made longer, or the stability of the aqueous dispersion is sometimes degraded.

In the present invention, it is preferable to mix a hydrophilic organic solvent during the preparation of the aqueous dispersion of the polyolefin resin in order to promote the preparation of the aqueous dispersion of the polyolefin resin and to reduce the dispersed particle size. The content of the hydrophilic organic solvent is preferably 50% by mass or less, more preferably 1 to 45% by mass, furthermore preferably 2 to 40% by mass and particularly preferably 3 to 35% by mass, in relation to the whole aqueous medium. When the content of the hydrophilic organic solvent exceeds 50% by mass, the medium substantially cannot be regarded as an aqueous medium and deviates from one of the objects of the present invention (environmental protection), and depending on the hydrophilic organic solvent used, the stability of the aqueous dispersion is sometimes degraded.

The hydrophilic organic solvent has a solubility in water at 20° C. of preferably 10 g/L or more, 20 g/L or more and furthermore preferably 50 g/L more for the purpose of obtaining an aqueous dispersion satisfactory in dispersion stability.

The hydrophilic organic solvent preferably has a boiling point of 150° C. or lower from the viewpoint of efficiently removing the hydrophilic organic solvent from the coating film in the film formation process. In the case of a hydrophilic organic solvent having a boiling point higher than 150° C., it tends to be difficult to evaporate the hydrophilic organic solvent by drying from the coating film, and in particular, during low-temperature drying, for example, the water resistance of the coating film and the adhesiveness to the substrate are sometimes degraded.

Examples of the preferable hydrophilic organic solvent include: alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol; ketones such as methyl ethyl ketone, methyl isobutyl ketone, ethyl butyl ketone and cyclohexanone; ethers such as tetrahydrofuran and dioxane;

esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate; glycol derivatives such as ethylene glycol monomethyl ether, ethylene glycol monoethyl ether, ethylene glycol monopropyl ether, ethylene glycol monobutyl ether and ethylene glycol ethyl ether acetate; and moreover, 1-methoxy-2-propanol, 1-ethoxy-2-propanol, 3-methoxy-3-methyl-1-butanol, methoxybutanol, acetonitrile, dimethylformamide, dimethylacetamide, diacetone alcohol, ethyl acetoacetate, 1,2-dimethyl glycerin, 1,3-dimethyl glycerin and trimethyl glycerin.

Among these, the following are preferable because of being effective in promoting the preparation of the aqueous dispersion of the polyolefin resin: ethanol, n-propanol, isopropanol, n-butanol, methyl ethyl ketone, cyclohexanone, tetrahydrofuran, dioxane, ethylene glycol monoethyl ether, ethylene glycol monopropyl ether, ethylene glycol monobutyl ether and diethylene glycol monomethyl ether.

In the present invention, these hydrophilic organic solvents may be used as mixtures of two or more thereof.

In order to more promote the preparation of the aqueous dispersion of the polyolefin resin, a hydrophobic organic solvent may further added. As the hydrophobic organic solvent, an organic solvent having a solubility in water at 20° C. of less than 10 g/L, and a boiling point of 150° C. or lower, from the same reason as described above, is preferable. Examples of the hydrophobic organic solvent include: olefinic solvents such as n-pentane, n-hexane, n-heptane, cycloheptane, cyclohexane and petroleum ether; aromatic solvents such as benzene, toluene and xylene; and halogen-containing solvents such as carbon tetrachloride, 1,2-dichloroethane, 1,1-dichloroethylene, trichloroethylene, 1,1,1-trichloroethane and chloroform. The addition amount of these hydrophobic organic solvents is preferably 15% by mass or less, more preferably 10% by mass or less and furthermore preferably 5% by mass or less, in relation to the aqueous dispersion. When the addition amount of the hydrophobic organic solvent exceeds 15% by mass, gelation or the like is sometimes caused.

<Aqueous Polyolefin Resin Dispersion>

In the aqueous polyolefin resin dispersion of the present invention, the particle sizes of the polyolefin resin particles dispersed in the aqueous dispersion are not particularly limited; however, the weight average particle size is preferably 0.15 μm or less, more preferably 0.10 μm or less, furthermore preferably 0.001 to 0.10 μm and particularly preferably 0.001 to 0.05 μm, from the viewpoint of the low-temperature film formability, the compactness and transparency of the coating film, and the mixing stability with other materials.

In the present invention, the dispersity (weight average particle size/number average particle size) related to the particle size distribution of the polyolefin resin in the aqueous dispersion is preferably 2.6 or less, and in particular, from the viewpoint of the smoothness of the coating film, the dispersity is preferably 2.0 or less, more preferably 1.5 or less and furthermore preferably 1.3 or less. When the dispersity exceeds 2.6, the smoothness and the adhesiveness of the coating film tend to be degraded.

In the present invention, the zeta potential is −20 mV or less and more preferably −30 mV or less. When the zeta potential is −20 mV or less, the aqueous polyolefin resin dispersion is excellent in the dispersion stability, and is also excellent in the mixing stability when further various additives are mixed with the aqueous polyolefin resin dispersion.

In the present invention, the content of the polyolefin resin in the aqueous dispersion can be appropriately selected according to the film formation conditions, the thickness and the performances of the coating film, and the like; however, for the purpose of appropriately maintaining the viscosity of the aqueous dispersion and developing satisfactory coating film formability, the content of the polyolefin resin is, without being particularly limited to, preferably 1 to 60% by mass, more preferably 3 to 55% by mass, furthermore preferably 5 to 50% by mass and particularly preferably 10 to 45% by mass.

It is preferable that the aqueous dispersion of the present invention substantially include no nonvolatile aqueous dispersing aid. The present invention does not exclude the use of a nonvolatile aqueous dispersing aid; however, without using any aqueous dispersing aid, by using the production method of the present invention, it is possible to finely and stably disperse the polyolefin resin in an aqueous medium. Accordingly, the coating film properties in low-temperature drying, in particular, the water resistance, the adhesiveness to the substrate and the heat sealing property are excellent, and these performances little vary over a long period of time.

Here, "the aqueous dispersing aid" means a chemical or compound added to promote the preparation of an aqueous dispersion or to stabilize the aqueous dispersion when an aqueous dispersion is produced; "nonvolatility" means that a nonvolatile substance has no boiling point under normal pressure, or a nonvolatile substance has a high boiling point (for example, 300° C. or higher) under normal pressure.

The statement that "an aqueous dispersion substantially does not include any nonvolatile aqueous dispersing aid" means that such an aid as described above is not used in the production (the preparation of the aqueous dispersion of the resin), and consequently the resulting aqueous dispersion does not contain the aid concerned. Accordingly, the content of such an aqueous dispersing aid as described above is particularly preferably 0% by mass; however, within a range not impairing the advantageous effects of the present invention, such an aqueous dispersing aid may be included in a content of 5% by mass or less, preferably 2% by mass or less and more preferably approximately less than 0.5% by mass in relation to the polyolefin resin component.

Examples of the nonvolatile aqueous dispersing aid as referred to in the present invention include: emulsifiers described below, compounds having a protective colloid function, modified waxes, high-acid-number acid-modified compounds and water-soluble polymers.

Examples of the emulsifiers include: cationic emulsifiers, anionic emulsifiers, nonionic emulsifiers and amphoteric emulsifiers; and surfactants in addition to the emulsifiers generally used for emulsion polymerization. Examples of the anionic emulsifiers include: sulfuric acid ester salts of higher alcohols, higher alkylsulfonic acid salts, higher carboxylic acid salts, alkylbenzenesulfonic acid salts, polyoxyethylene alkylsulfate salts, polyoxyethylene alkyl phenyl ether sulfate salts and vinyl sulfosuccinate. Examples of the nonionic emulsifiers include: compounds having polyoxyethylene structure such as polyoxyethylene alkyl ether, polyoxyethylene alkyl phenyl ether, polyethylene glycol fatty acid ester, ethylene oxide-propylene oxide block copolymer, polyoxyethylene fatty acid amide and ethylene oxide-propylene oxide copolymer; and sorbitan derivatives such as polyoxyethylene sorbitan fatty acid ester. Examples of the amphoteric emulsifiers include: lauryl betaine and lauryl dimethyl amine oxide.

Examples of the compounds having a protective colloid function, modified waxes, high-acid-number acid-modified compounds and water-soluble polymers include compounds generally used as the dispersion stabilizers for fine particles such as: polyvinyl alcohol; carboxyl group-modified polyvinyl alcohol; carboxymethyl cellulose; hydroxyethyl cellulose; hydroxypropyl cellulose; modified starch; polyvinylpyrrolidone; polyacrylic acid and salts thereof; acid-modified polyolefin waxes usually having a number average molecular weight of 5000 or less such as carboxyl group-containing polyethylene wax, carboxyl group-containing polypropylene wax and carboxyl group-containing polyethylene-propylene wax and the salts of these waxes; acrylic acid-maleic anhydride copolymer and the salts thereof; carboxyl group-containing polymers having an unsaturated carboxylic acid content of 10% by mass or more such as styrene-(meth)acrylic acid copolymer, ethylene-(meth)acrylic acid copolymer, isobutylene-maleic anhydride alternating copolymer and (meth)acrylic acid-(meth)acrylic acid ester copolymer, and the salts of these polymers; polyitaconic acid and the salts thereof; water-soluble acrylic copolymers having amino groups; gelatin; gum arabic; and casein.

The polyolefin resin constituting the aqueous polyolefin resin dispersion of the present invention includes as described above the olefin component and the unsaturated carboxylic acid component as the copolymerization components; the content of the unsaturated carboxylic acid component as the copolymerization component is required to be 1 part by mass or more in relation to 100 parts by mass of the total amount (A+B) of the propylene (A) and the olefin(s) (B) other than propylene, from the viewpoint of the dispersibility in the aqueous medium.

In the aqueous dispersion including the polyolefin resin, the content of the unsaturated carboxylic acid monomer in the dry residue of the aqueous dispersion is required to be 10,000 ppm or less. When the suppression of the increase of the weight average particle size of the polyolefin resin or the suppression of the viscosity increase of the aqueous dispersion during a continuous production of the aqueous dispersion, and additionally the water resistance, chemical resistance and moist heat resistance of the coating film obtained from the aqueous dispersion are demanded, the content of the unsaturated carboxylic acid monomer in the polyolefin resin is more preferably 5,000 ppm or less, furthermore preferably 1,000 ppm or less, particularly preferably 500 ppm or less and most preferably 100 ppm or less. When the below-described additives are included, the dry residue means the dry residue of the aqueous dispersion after the addition of the additives.

As described above, in the polyolefin resin, the unreacted unsaturated carboxylic acid monomer remains. When the content of the unsaturated carboxylic acid monomer included in the dry residue of the aqueous dispersion exceeds 10,000 ppm, the water resistance, chemical resistance and moist heat resistance of the obtained coating film is sometimes poor.

The unsaturated carboxylic acid monomer in the dry residue of the aqueous dispersion can be quantitatively determined by preparing a dry residue by removing the liquid medium from the aqueous dispersion, and by using the same method as the above-described method for quantitatively determining the unsaturated carboxylic acid monomer in the polyolefin resin.

<Method for Producing Aqueous Polyolefin Resin Dispersion>

Next, an example of the method for producing an aqueous polyolefin resin dispersion is described.

The method for obtaining the aqueous polyolefin resin dispersion of the present invention is not particularly limited; there can be adopted a method in which the above-described individual components, namely, the polyolefin resin, the aqueous medium, and if necessary, an organic solvent, a basic compound and the like are heated and stirred in a hermetically sealable vessel; this method is most preferable.

As the vessel, vessels used as a solid/liquid stirring apparatus or an emulsifying apparatus can be used, and it is preferable to use an apparatus capable of being pressurized to 0.1 MPa or more. The stirring method and the stirring rotation speed are not particularly limited; the stirring may be a low speed stirring that allows the polyolefin resin to be in a suspended state in the aqueous medium. Accordingly, the use of a high speed stirring (for example, 1000 rpm or more) is not required; even with a simple apparatus, the aqueous dispersion can be produced.

For example, in the above-described apparatus, the raw materials such as the polyolefin resin and the aqueous medium are placed, and are mixed under stirring preferably at a temperature of 40° C. or lower. Subsequently, the stirring is continued (for example, for 5 to 300 minutes) preferably until coarse particles disappear while the temperature inside the vessel is being maintained at 80 to 240° C., preferably at 100 to 220° C., furthermore preferably at 110 to 200° C. and particularly preferably at 110 to 190° C.

Subsequently at least one selected from the basic compound, the organic solvent and water is added to the reaction system, the resulting mixture is heated under stirring in the hermetically sealed vessel, again at a temperature of 80 to 240° C. In this way, the addition of a component(s) constituting the aqueous medium and the heating under stirring performed again allow the weight average particle size of the polyolefin resin to be 0.15 μm or less. Such a preparation of the aqueous dispersion of a resin in two stages of steps as described above is preferable also for the purpose of regulating the dispersity associated with the particle size distribution so as to fall within a preferable range.

The method for additionally mixing the basic compound, the organic solvent or water is not particularly limited; examples of the method concerned include: a method in which the additional mixing is performed under a pressurized condition by using, for example, a gear pump; and a method in which the temperature inside the reaction system is once decreased so as for the reaction system to reach normal pressure and then the additional mixing is performed.

In the additional mixing, the proportions of the basic compound, the organic solvent and water may be appropriately determined according to, for example, the intended solid content concentration, the intended particle size and the intended dispersity. The total content of the basic compound, the organic solvent and water is regulated in such a way that the solid content concentration after mixing is preferably 1 to 50% by mass, more preferably 2 to 45% by mass and particularly preferably 3 to 40% by mass.

In the above-described step, when the temperature inside the vessel is lower than 80° C., the preparation of the aqueous dispersion of the polyolefin resin hardly proceeds; on the other hand, when the temperature inside the vessel exceeds 240° C., the molecular weight of the polyolefin resin is sometimes decreased When the organic solvent is used in the production of the aqueous dispersion, after the preparation of the aqueous dispersion the organic solvent may be partially distilled off outside the reaction system by a solvent-removing treatment generally referred to as "stripping" to reduce the content of the organic solvent. The content of the organic solvent in the aqueous dispersion can be reduced by stripping to 10% by mass or less, is more preferably reduced to 5% by mass or less, and is more preferably reduced to 1% by mass or less from the viewpoint of environment. In the step of stripping, the organic solvent used in the preparation of the aqueous dispersion can be substantially completely distilled off; however, for the purpose of substantially completely distilling off the organic solvent, the degree of pressure reduction in the apparatus is required to be enhanced, or the operation time is required to be elongated; in consideration of the productivity, the lower limit of the organic solvent content is preferably approximately 0.01% by mass.

Examples of the stripping method include a method in which the aqueous dispersion is heated while being stirred under normal pressure or reduced pressure to distill off the organic solvent. The distilling off the aqueous medium increases the solid content concentration, and hence, for example, when the viscosity is increased to degrade the workability, water may be beforehand added to the aqueous dispersion.

The solid content concentration of the aqueous dispersion can be regulated by, for example, a method for distilling off the aqueous medium, or a method for diluting the aqueous dispersion with water.

The adoption of the production method of the present invention enables the preparation of an aqueous dispersion in a state of a uniform liquid in which the polyolefin resin is efficiently dispersed or dissolved. A uniform liquid as referred to herein means a state in which no portion different in the solid content concentration from other portions, such as precipitate, phase separation or skinning, is found in the aqueous dispersion as far as the exterior appearance of the aqueous dispersion is concerned.

<Additives>

To the aqueous dispersion of the present invention, for the purpose of further improving the performances thereof according to the intended purposes, for example, another polymer, a tackifier, an inorganic particle, a cross-linking agent, a pigment and a dye can be added.

The other polymers and the tackifiers to be added to the aqueous dispersion of the present invention are not particularly limited. Examples of the other polymers and the tackifiers include: polyvinyl acetate, ethylene-vinyl acetate copolymer, polyvinyl chloride, polyvinylidene chloride, ethylene-(meth)acrylic acid copolymer, ethylene-(meth)acrylic acid ester-maleic anhydride copolymer, styrene-maleic acid resin, styrene-butadiene resin, butadiene resin, acrylonitrile-butadiene resin, polyurethane resin, poly(meth)acrylonitrile resin, (meth)acrylamide resin, chlorinated polyethylene resin, chlorinated polypropylene resin, polyester resin, modified nylon resin, tackifier resins such as rosin, phenolic resin, silicone resin and epoxy resin; mixtures of two or more of these other resins may also be used, if necessary. It is to be noted that these polymers may be used as they are solid, but are preferably used as processed into aqueous dispersions for the purpose of maintaining the stability of the aqueous dispersion. Among these, it is preferable to use polyurethane resin from the viewpoint of the adhesiveness to the substrate, the chemical resistance and the heat resistance, As the polyurethane resin, it is possible to use a polymer having in the main chain thereof the urethane bonds, such as a polymer obtained by the reaction between a polyol compound and a polyisocyanate compound.

Examples of the polyol component constituting the polyurethane resin include, without being particularly limited to: water; low molecular weight glycols such as ethylene glycol, diethylene glycol, triethylene glycol, 1,3-butanediol, 1,4-butanediol, 1,2-propanediol, 1,3-propanediol, 1,6-hexanediol, neopentyl glycol, 1,4-cyclohexanedimethanol, methyl-1,5-pentanediol, 1,8-octanediol, 2-ethyl-1,3-hexanediol, diethylene glycol, triethylene glycol and dipropylene glycol; low molecular weight polyols such as trimethylolpropane, glycerin and pentaerythritol; polyol compounds having the ethylene oxide unit or the propylene oxide unit; high molecular weight diols such as polyether diols and polyester diols; bisphenols such as bisphenol A and bisphenol F; and dimer diol prepared by converting the carboxyl groups of dimer acid into hydroxyl groups.

As the polyisocyanate component constituting the polyurethane resin, one or mixtures of two or more of heretofore known aromatic, aliphatic and alicyclic diisocyanates can be used. Specific examples of the diisocyanates include: tolylene diisocyanate, 4,4'-diphenylmethane diisocyanate, 1,3-phenylene diisocyanate, hexamethylene diisocyanate, xylylene diisocyanate, 1,5-naphthylene diisocyanate, isophorone diisocyanate, dimeryl diisocyanate, lysine diisocyanate, hydrogenated 4,4'-diphenylmethane diisocyanate, hydrogenated tolylene diisocyanate, dimer diisocyanate obtained by converting carboxyl groups of dimeric acid into isocyanate groups, and adducts, biurets and isocyanurates of these diisocyanate compounds. For the diisocyanates, tri- or higher-functional polyisocyanates such as triphenylmethane triisocyanate, and polymethylene polyphenyl isocyanate may also be used.

In the present invention, commercially available aqueous polyurethane resins can be used as the aqueous polyurethane resin suitable to add to the aqueous dispersion. Examples of the commercially available aqueous polyurethane resin include: Takerack Series (such as W-615, W-6010 and W-511) manufactured by Mitsui Chemicals, Inc.; Adeka Bontiter series (such as HUX-232, HUX-320, HUX-380 and HUX-401) manufactured by Adeka Corp.; Super Flex series (such as 500, 550, 610 and 650) manufactured by Dai-ichi Kogyo Seiyaku Co., Ltd.; and Hydran series (such as HW-311, HW-350 and HW-150) manufactured by DIC Corp.

When a polyurethane resin is used as an additive, the content of the polyurethane resin is preferably 1 to 300 parts by mass, more preferably 1 to 200 parts by mass and furthermore preferably 3 to 100 parts by mass, in relation to 100 parts by mass of the polyolefin resin. When the content of the polyurethane resin is less than 1 part by mass, the improvement of the coating film performances is sometimes insufficient, and on the other hand, when the content of the polyurethane resin exceeds 300 parts by mass, the adhesiveness to the substrate is sometimes degraded.

Examples of the inorganic particle to be added to the aqueous dispersion of the present invention include: inorganic particles of metal oxides such as magnesium oxide, zinc oxide and tin oxide; inorganic particles of calcium carbonate and silica; and layered inorganic compounds such as vermiculite, montmorillonite, hectorite, hydrotalcite and synthetic mica. The average particle sizes of these inorganic particles are preferably 0.005 to 10 μm and more preferably 0.005 to 5 μm, from the viewpoint of the stability of the aqueous dispersion. As inorganic particles, a plurality of types of inorganic particles may be used as mixtures. Zinc oxide can be used for the purpose of screening ultraviolet ray, and tin oxide can be used for the purpose of preventing electrostatic charging.

As the cross-linking agent to be added to the aqueous dispersion of the present invention, for example, the following can be used: a cross-linking agent having a self-cross-linkability, a cross-linking agent having in the molecule thereof a plurality of functional groups capable of reacting with an unsaturated carboxylic acid component, and a metal having polyvalent coordination positions.

Specific examples of such cross-linking agents include: oxazoline group-containing compounds, carbodiimide group-containing compounds, isocyanate group-containing compounds, epoxy group-containing compounds, melamine compounds, urea compounds, zirconium salt compounds, and silane coupling agent; if necessary, a plurality of cross-linking agents may be used as mixtures. Among these, from the viewpoint of the easiness in handling, it is preferable to add an oxazoline group-containing compound, a carbodiimide group-containing compound, an isocyanate group-containing compound or an epoxy group-containing compound.

The oxazoline group-containing compound is not particularly limited as long as the compound concerned has at least two or more oxazoline groups in the molecule thereof. Examples of such an oxazoline group-containing compound include: oxazoline group-containing compounds such as 2,2'-bis(2-oxazoline), 2,2'-ethylene-bis(4,4'-dimethyl-2-oxazoline), 2,2'-p-phenylene-bis(2-oxazoline) and bis(2-oxazolinylcyclohexane) sulfide; and oxazoline group-containing polymers. These can be used each alone or in combinations of two or more thereof. Among these, from the viewpoint of the easiness in handling, an oxazoline group-containing polymer is preferable.

In general, an oxazoline group-containing polymer can be obtained by polymerizing the addition-polymerizable oxazoline such as 2-vinyl-2-oxazoline, 2-vinyl-4-methyl-2-oxazoline or 2-isopropenyl-2-oxazoline. With the oxazoline group-containing polymer, if necessary, another monomer may also be copolymerized. The polymerization method of the oxazoline group-containing polymer is not particularly limited, and can adopt heretofore known polymerization methods.

Examples of the commercially available oxazoline group-containing polymer include: Epocros series manufactured by Nippon Shokubai Co., Ltd., such as water-soluble types such as "WS-500" and "WS-700"; and emulsion types such as "K-1010E," "K-1020E," "K-1030E," "K-2010E," "K-2020E" and "K-2030E."

The carbodiimide group-containing compound is not particularly limited as long as the compound concerned has at least two or more carbodiimide groups in the molecule thereof. Examples of such a carbodiimide group-containing compound include: carbodiimide group-containing compounds such as p-phenylene-bis(2,6-xylylcarbodiimide), tetramethylene-bis(t-butylcarbodiimide) and cyclohexane-1,4-bis(methylene-t-butylcarbodiimide); and carbodiimide group-containing polymers, namely polycarbodiimides. One or two or more of these can be used. Among these, from the viewpoint of the easiness in handling, polycarbodiimide is preferable.

The method for producing polycarbodiimide is not particularly limited, and polycarbodiimide can be produced by, for example, by a condensation reaction involving the carbon dioxide removal from an isocyanate compound. The isocyanate compound is also not limited, and may be any of an aliphatic isocyanate, an alicyclic isocyanate and an aromatic isocyanate. With the isocyanate compound, if necessary, for example, a multifunctional liquid rubber or a polyalkylenediol may also be copolymerized. Examples of the commercially available product of polycarbodiimide include Carbodilite series manufactured by Nisshinbo Chemical Inc. Specific examples of the commercially available product include: water-soluble types "SV-02," "V-02," "V-02-L2" and "V-04"; emulsion types "E-01" and "E-02"; organic solution types "V-01," "V-03," "V-07" and "V-09"; and solvent-free type "V-05."

The isocyanate group-containing compound is not particularly limited as long as the compound concerned has at least two or more isocyanate groups in the molecule thereof. Examples of such an isocyanate compound include: multifunctional isocyanate compounds such as 2,4-tolylene diisocyanate, 2,6-tolylene diisocyanate, diphenylmethane 2,4'- or 4,4'-diisocyanate, polymethylene polyphenyl diisocyanate, tolidine diisocyanate, 1,4-diisocyanate butane, hexamethylene diisocyanate, 1,5-diisocyanate-2,2-dimethylpentane, 2,2,4- or 2,4,4-trimethyl-1,6-diisocyanatehexane, 1,10-diisocyanatedecane, 1,3- or 1,4-diisocyanatecyclohexane, 1-isocyanate-3,3,5-trimethyl-5-isocyanatemethyl-cyclohexane, 4,4'-diisocyanatedicyclohexylmethane, hexahydrotoluene 2,4- or 2,6-diisocyanate, perhydro-2,4'- or 4,4'-diphenylmethane diisocyanate, naphthalene 1,5-diisocyanate, xylylene diisocyanate, 1,3-bis(isocyanatemethyl)cyclohexane and tetramethylxylylene diisocyanate; and modified products of these. The modified products as referred to herein mean the products obtained by modifying, by heretofore known methods, diisocyanates of multifunctional isocyanate compounds; examples of such modified products may include: multifunctional isocyanate compounds having, for example, an allophanate group, a biuret group, a cabodiimide group, a uretoneimine group, a uretdione group or an isocyanurate group; and moreover, adduct-type multifunctional isocyanate compounds modified with a multifunctional alcohol such as trimethylolpropane. It is to be noted that the isocyanate group-containing compound may include a monoisocyanate within a range of 20% by mass or less. One or two or more of these can be used.

The isocyanate group-containing compound can usually be obtained by allowing a multifunctional isocyanate compound and a monovalent or multivalent nonionic polyalkylene ether alcohol to react with each other. Examples of the commercially available aqueous product of the multifunctional isocyanate compound include: Bayhydur 3100, Bayhydur VPLS2150/1, SBU isocyanate L801, Desmodur N3400, Desmodur VPLS2102, Desmodur VPLS2025/1, SBU isocyanate 0772 and Desmodur DN manufactured by Sumitomo Bayer Urethane Co., Ltd.; Takenate WD720, Takenate WD725 and Takenate WD730 manufactured by Takeda Pharmaceutical Co., Ltd.; Duranate WB40-100, Duranate WB40-80D and Duranate WX-1741 manufactured by Asahi Kasei Corp.; and Basonat HW-100 and Basonat LR-9056 manufactured by BASF Inc.

The epoxy group-containing compound is not particularly limited as long as the compound concerned has at least two or more epoxy groups in the molecule thereof. Examples of such an epoxy group-containing compound include: glycidyl ether type compounds such as bisphenol A diglycidyl ether, bisphenol A β-dimethyl glycidyl ether, bisphenol F diglycidyl ether, tetrahydroxyphenylmethane tetraglycidyl ether, resorcinol diglycidyl ether, brominated bisphenol A diglycidyl ether, chlorinated bisphenol A diglycidyl ether, hydrogenated bisphenol A diglycidyl ether, diglycidyl ether of bisphenol A alkylene oxide adduct, novolac glycidyl ether, polyalkylene glycol diglycidyl ether, glycerin triglycidyl ether, pentaerythritol diglycidyl ether and epoxy urethane resin; glycidyl ether.ester type compounds such as p-oxybenzoic acid glycidyl ether.ester; glycidyl ester type compounds such as phthalic acid diglycidyl ester, tetrahydrophthalic acid diglycidyl ester, hexahydrophthalic acid diglycidyl ester, acrylic acid diglycidyl ester, dimer acid diglycidyl ester; glycidyl amine type compounds such as glycidyl aniline, tetraglycidyl diaminodiphenyl methane, triglycidyl isocyanurate and triglycidyl aminophenol; linear aliphatic epoxy resins such as epoxidized polybutadiene and epoxidized soybean oil; and alicyclic epoxy resins such as 3,4-epoxy-6-methylcyclohexylmethyl-3,4-epoxy-6-methylcyclohexane carboxylate, 3,4-epoxycyclohexylmethyl(3,4-epoxycyclohexane) carboxylate, bis(3,4-epoxy-6-methylcyclohexylmethyl) adipate, vinylcyclohexene diepoxide, dicyclopentadiene oxide, bis(2,3-epoxycyclopentyl) ether and limonene dioxide. One or two or more of these can be used.

Examples of the commercially available epoxy compounds, as aqueous products suitable for the present invention, include: Denacol seires (such as EM-150 and EM-101) manufactured by Nagase ChemteX Corp.; Adeka Resin series manufactured by Asahi Denka Kogyo Co., Ltd.; from the viewpoint of the improvement of UV ink adhesiveness and scratch resistance, multifunctional epoxy resin emulsions such as Adeka Resins EM-0517, EM-0526, EM-11-50B and EM-051R are preferable.

The addition amount of the cross-linking agent is preferably 0.01 to 80 parts by mass, more preferably 0.1 to 50 parts by mass and furthermore preferably 0.5 to 30 parts by mass in relation to 100 parts by mass of the polyolefin resin, from the viewpoint of the improvement of, for example, the water resistance and the solvent resistance of the coating film. When the addition amount of the cross-linking agent is less than 0.01 part by mass, the improvement of the coating film performances is sometimes insufficient, and when the addition amount of the cross-linking agent exceeds 80 parts by mass, for example, the workability is sometimes degraded.

Examples of the pigment and the dye to be added to the aqueous dispersion of the present invention include titanium oxide, zinc oxide and carbon black; and it is possible to use any of a disperse dye, an acidic dye, a cationic dye and a reactive dye.

To the aqueous dispersion of the present invention, various chemicals such as a leveling agent, an antifoaming agent, a foaming preventing agent, a pigment dispersant, an ultraviolet absorber, a thickening agent, a weathering agent and a flame retardant can also be further added if necessary.

<Method for Using Aqueous Polyolefin Resin Dispersion>

Next, the method for using the aqueous polyolefin resin dispersion of the present invention is described.

The aqueous dispersion of the present invention is excellent in the coating film formability. Specifically, the aqueous dispersion of the present invention is uniformly applied to the surface of various substrates, the applied aqueous dispersion is subjected to setting at around room temperature if necessary, then the applied aqueous dispersion is subjected to a heat treatment for drying or drying and baking, and thus, a uniform coating film can be formed so as to be allowed to adhere to the surface of various substrates.

For the film formation, for example, the following heretofore known methods can be adopted: gravure roll coating, reverse roll coating, wire bar coating, lip coating, air knife coating, curtain flow coating, spray coating, dip coating and brush painting method.

The application amount of the aqueous dispersion is appropriately selected according to the application thereof, and the application amount after drying is preferably 0.01 to 100 g/m$^2$, more preferably 0.1 to 50 g/m$^2$ and furthermore preferably 0.2 to 30 g/m$^2$. When a film is formed so as for the application amount after drying to be 0.01 to 100 g/m$^2$, it is possible to obtain a coating film excellent in uniformity.

For the purpose of regulating the application amount, in addition to the appropriate selection of the apparatus to be used in the application and the use conditions of the apparatus, it is preferable to use an aqueous dispersion regulated in the concentration according to the intended thickness of the coating film. The concentration of the aqueous dispersion can be regulated by the feed composition at the time of preparation, or may also be regulated by appropriately diluting or concentrating a once prepared aqueous dispersion.

As an apparatus for drying or baking, for example, a common hot circulation type oven or an infrared heater can be used.

The heating temperature and the heating time are appropriately selected according to the properties of the substrate, an object of application, and the addition amounts of the above-described various materials allowed to be optionally mixed in the aqueous dispersion. The heating temperature is preferably 20 to 250° C., more preferably 60 to 230° C. and furthermore preferably 80 to 210° C. On the other hand, the heating time is preferably 1 second to 20 minutes, more preferably 5 seconds to 15 minutes and furthermore preferably 5 seconds to 10 minutes. It is to be noted that, when a cross-linking agent is added, it is preferable to appropriately select the heating temperature and the heating time depending on the type of the cross-linking agent, for the purpose of allowing the reaction between the carboxyl group in the polyolefin resin and the cross-linking agent to proceed sufficiently.

The coating film obtained from the aqueous polyolefin resin dispersion of the present invention is excellent in the adhesiveness to the polyolefin resin substrate, and accordingly the aqueous polyolefin resin dispersion of the present invention can be suitably used as, for example, a coating agent, a primer, a coating material and an ink.

Moreover, the coating film obtained from the aqueous polyolefin resin dispersion of the present invention is also satisfactory in the adhesiveness to the substrate other than the polyolefin resin substrate, and accordingly, the aqueous polyolefin resin dispersion of the present invention can be suitably used as an adhesive for forming a laminated body by allowing two or more substrates to adhere to each other.

Specific examples of a coating agent, a primer, a coating material, an ink, an adhesive and the like, including the aqueous polyolefin resin dispersion of the present invention include: an anchor coating agent for PP extrusion lamination, a coating agent for a secondary battery separator, a primer for a UV-curable coating agent, a primer for shoes, a primer for an automobile bumper, a primer for a clear box, a coating material for a PP substrate, an adhesive for a packaging material, an adhesive for a paper vessel, an adhesive for a lid member, an adhesive for an in-mold transfer foil, an adhesive for a PP steel plate, an adhesive for a solar cell module, an adhesive for hair transplantation, an adhesive for a binder for a secondary battery electrode, an adhesive for an exterior package of a secondary battery, an adhesive for a belt molding for an automobile, an adhesive for an automobile member, an adhesive for an automobile component, an adhesive for different types of substrates, and a fiber sizing agent.

The aqueous polyolefin resin dispersion of the present invention can be used as an adhesive when a polypropylene resin as a sealant resin is laminated on a substrate.

As the method for producing a laminated body, any method may be adopted, and examples of such a method include a dry lamination method and an extrusion lamination method. The aqueous polyolefin resin dispersion of the present invention can be applied to the production of a laminated body by the extrusion lamination method, which is simpler with respect to the steps and advantageous in cost.

Specific production conditions of a laminated body is preferably such that when a sealant resin including the polypropylene resin is melt extruded from a T-die to form a sealant layer, the resin temperature immediately after the extrusion from the T-die is 230 to 300° C. The resin temperature immediately after the extrusion from the T-die is preferably a higher temperature for the purpose of improving the adhesiveness; however, from the viewpoint of the thermal decomposition of the polypropylene resin, the resin temperature immediately after the extrusion from the T-die is more preferably 230 to 270° C. and furthermore preferably 240 to 260° C.

A laminated body obtained by laminating a sealant resin on the adhesive layer surface may be subjected to an aging treatment for the purpose of improving the adhesiveness. The aging treatment temperature is preferably approximately normal temperature to 100° C., and from the viewpoint of the damage due to heat to the laminated body and the economic efficiency, the aging temperature is more preferably 30 to 60° C. and furthermore preferably 40 to 50° C.

The laminate strength (peel strength) of the laminated body can be evaluated by performing a T-type peel test with a tensile tester, in an atmosphere of 20° C. and 65% RH, under the condition of a tensile rate of 200 mm/min. It is to be noted that when the peel strength is extremely high, sometimes elongation or breakage occurs in the sealant layer during measurement to preclude peeling, and no accurate peel strength can be measured. Such a phenomenon can be described to be the most preferable state as a laminated state, and offers a corroborative evidence for excellent adhesiveness.

In general, a packaging material formed of a laminated body is required to have a peel strength of 1.0 N/15 mm or more, and as a level practically free from problems, the peel strength is preferably 1.5 N/15 mm or more and more preferably 2.0 N/15 mm or more.

When a laminated body laminated by using the aqueous polyolefin resin dispersion of the present invention is used as a packaging material, even after storage of the content or even after performing a retort treatment and a boil treatment, the packaging material preferably maintains a peel strength of 1.5 N/15 mm or more, more preferably maintains a peel strength of 2.0 N/15 mm or more, and is most preferably free from the degradation of the peel strength.

EXAMPLES

Hereinafter, the present invention is specifically described with reference to Examples. However, the present invention is not limited by these Examples.

Various properties were measured or evaluated by the following methods.

1. Polyolefin Resin
(1) Content of Unsaturated Carboxylic Acid Component
The content of the unsaturated carboxylic acid component in relation to the total amount of the propylene (A) and the olefin(s) (B) other than propylene was determined by an infrared absorption spectrum analysis (Perkin Elmer System-2000 Fourier Transformation Infrared Spectrophotometer, resolution: 4 cm$^{-1}$).

(2) Constitution of Resin Other than Unsaturated Carboxylic Acid Component
The mass ratio between the propylene (A) and the olefin(s) (B) other than propylene was determined by performing $^1$H-NMR and $^{13}$C-NMR analyses (Varian, Inc., 300 MHz) in ortho-dichlorobenzene (d$_4$) at 120° C. In the $^{13}$C-NMR analysis, measurement was performed by the gated decoupling method considering quantitativity.

(3) Weight Average Molecular Weight
The weight average molecular weight was measured by using GPC analysis (HLC-8020, manufactured by Tosoh Corp., two KF-804L columns and one KF805L column manufactured by Shodex Co., Ltd. were used as connected to each other), by using tetrahydrofuran as an eluent, under the conditions of a flow rate of 1 mL/min and a temperature of 40° C. Approximately 10 mg of a resin was dissolved in 5.5 mL of tetrahydrofuran, and filtered with a PTFE membrane filter, and the resulting filtrate was used as a measurement sample. From the calibration curve prepared with polystyrene standard samples, the weight average molecular weight of the sample was obtained. When the resin was hardly dissolved in tetrahydrofuran, the resin was dissolved in ortho-dichlorobenzene.

(4) Content of Unsaturated Carboxylic Acid Monomer
Approximately 0.05 g of a polyolefin resin pellet freeze pulverized into a fine powder was weighed precisely, 20 mL of methanol was used as an extraction solvent, and extraction was performed at room temperature for 21 hours with continuous inversion mixing. The filtrate obtained by filtering the extract with a disk filter (pore size: 0.45 μm) was quantitatively analyzed with a high-performance liquid chromatography (HP1100, manufactured by Hewlett Packard Corp., column: Puresil manufactured by Waters Corp., 5 μm, C18, 120 Å, ϕ4.6 mm×250 mm (40° C.)

When the content of the unsaturated carboxylic acid monomer is less than 1,000 ppm, the amount of the polyolefin resin pellet was altered to 0.5 g, and a quantitative analysis was performed in the same manner as described above.

A calibration curve was prepared by using the standard samples of the unsaturated carboxylic acid monomer, each having a known concentration.

2. Aqueous Dispersion
(1) Number Average Particle Size, Weight Average Particle Size, and Dispersity of Polyolefin Resin Particles
The number average particle size (mn) and the weight average particle size (mw) were measured by using the Nanotrac Wave-UZ152 Particle Size Distribution Analyzer manufactured by Nikkiso Co. The refractive index of the resin was taken to be 1.5.

The dispersity was calculated on the basis of the following formula:

Dispersity=weight average particle size (mw)/number average particle size (mn)

(2) Zeta Potential
The zeta potential was measured by using the apparatus described in foregoing (1).

(3) Viscosity
For an aqueous dispersion after 300-mesh filtration, the rotational viscosity (mPa·s) at a temperature of 20° C. was measured by using a B-type viscometer (Model DVL-BII Digital Viscometer, manufactured by Tokimec Inc.).

(4) Content of Unsaturated Carboxylic Acid Monomer
Approximately 0.05 g of a fine powder prepared by freeze pulverizing the dry residue obtained by drying the aqueous dispersion was weighed precisely, 20 mL of methanol was used as an extraction solvent, and extraction was performed at room temperature for 21 hours with continuous inversion mixing. The filtrate obtained by filtering the extract with a disk filter (pore size: 0.45 μm) was quantitatively analyzed with a high-performance liquid chromatography (HP1100, manufactured by Hewlett Packard Corp., column: Puresil manufactured by Waters Corp., 5 μm, C18, 120 Å, ϕ4.6 mm×250 mm (40° C.)).

When the content of the unsaturated carboxylic acid monomer is less than 1,000 ppm, the amount of the dry residue was altered to 0.5 g, and a quantitative analysis was performed in the same manner as described above.

A calibration curve was prepared by using the standard samples of the unsaturated carboxylic acid monomer, each having a known concentration.

(5) Mixing Stability

An aqueous coating material was prepared by mixing the aqueous polyolefin resin dispersion and an aqueous dispersion (Lion Paste W-376R, manufactured by Lion Corp.) including carbon black as a pigment in such a way that in relation 100 parts by mass of the solid content of the polyolefin resin, the amount of the carbon black in terms of the solid content thereof is 80 parts by mass, and by stirring the resulting mixture with a propeller. The obtained coating material was allowed to stand at 40° C. for 30 days, then the state of the coating material was visually observed, and the coating material was evaluated on the basis of the following three grades.

G (Good): Neither aggregates nor phase separation is found.

A (Average): No phase separation is found, but a small amount of aggregates are found.

P (Poor): A large amount of aggregates are found or a phase separation is found.

3. Coating Film (1) Adhesiveness

The aqueous dispersion was applied to a PP molded piece (PP: Novatec PP MA3, manufactured by Nippon Polypropylene Co., Ltd.) by using a Meyer bar so as for the application amount after drying to be approximately 2 g/m$^2$, and dried at 130° C. for 10 minutes to obtain a coating film.

The obtained coating film on the PP molded piece was subjected to the tape peel test (cross-cut adhesion test) based on the cross-cut method described in JIS K5400. Specifically, by the cross-cut method, the coating film was cut into 100 sections, and after the tape peel, in terms of the number of the sections each holding a residual coating film, the adhesiveness was evaluated by the cross-cut adhesion test on the basis of the following standards. The evaluation of the cross-cut adhesion test is preferably marked with E (Excellent).

E (Excellent): In 100 sections, the coating film remains.

G (Good): In 95 to 99 sections, the coating film remains.

A (Average): In 90 to 94 sections, the coating film remains.

P (Poor): In 89 or less sections, the coating film remains.

(2) Water Resistance

The aqueous dispersion was applied to the untreated surface of a stretched polypropylene film (OP U-1, thickness: 20 μm, manufactured by Mitsui Chemicals Tohcello, Ltd.) by using a Meyer bar so as for the application amount after drying to be approximately 2 g/m$^2$, and dried at 60° C. for 30 seconds. The coating film prepared in this way was immersed in heated water at 40° C. for 24 hours.

For the coating film on the stretched polypropylene film after immersion, the cross-cut adhesion test was performed in the same manner as in foregoing (1), and the water resistance was evaluated. The evaluation of the cross-cut adhesion test is preferably marked with A (Average) or higher, and particularly preferably marked with G (Good) or higher.

The surface of the coating film was visually observed, and the exterior appearance was evaluated on the basis of the following indexes.

G (Good): No change occurs in the coating film.

A (Average): The coating film is not exfoliated, but whitening or blisters are identified.

P (Poor): The coating film is exfoliated.

(3) Chemical Resistance

The aqueous dispersion was applied to a PP molded piece (PP: Novatec PP MA3, manufactured by Nippon Polypropylene Co., Ltd.) by using a Meyer bar so as for the application amount after drying to be approximately 2 g/m$^2$, and dried at 130° C. for 10 minutes to obtain a coating film. The laminated body obtained in this way was immersed in a pseudo gasoline (an equivolume mixture of toluene and isooctane (both manufactured by Wako Pure Chemical Industries, Ltd.)) at 20° C. for 24 hours, and then dried.

For the coating film on the PP molded piece after drying, the cross-cut adhesion test was performed in the same manner as in foregoing (1), and thus the chemical resistance was evaluated. The evaluation of the cross-cut adhesion test is preferably marked with A (Average) or higher, and particularly preferably marked with G (Good) or higher.

The surface of the coating film was visually observed, and the exterior appearance was evaluated on the basis of the following indices.

G (Good): The coating film is free from any change.

A (Average): The coating film is not exfoliated, but whitening or blisters are identified.

P (Poor): The coating film is exfoliated.

(4) Low-Temperature Film Formability

The aqueous dispersion was applied to a PP molded piece (PP: Novatec PP MA3, manufactured by Japan Polypropylene Corp.) by using a Meyer bar so as for the application amount after drying to be approximately 2 g/m$^2$, and dried at 25° C. for 30 minutes.

The obtained coating film on the PP molded piece was evaluated in the same manner as in foregoing (1). The evaluation of the cross-cut adhesion test is preferably marked with A (Average) or higher, and particularly preferably marked with G (Good) or higher.

(5) Adhesiveness (PP Resin)

A two-component curable type urethane-based adhesive (manufactured by Toyo-Morton, Ltd.) was applied to the corona treated surface of a biaxially stretched polyester resin film (Emblet, thickness: 12 μm, manufactured by Unitika Ltd.) by using a gravure coater so as for the application amount after drying to be 5 g/m$^2$, and dried; then, a sheet of aluminum foil (thickness: 7 μm) was bonded to the dried adhesive layer to prepare a substrate.

The aqueous dispersion was applied to the aluminum surface of the substrate so as for the application amount after drying to be approximately 0.5 g/m$^2$, and dried at 100° C. for 1 minute to form an adhesive layer.

Next, by using an extrusion-lamination apparatus, on the surface of the adhesive layer, a polypropylene resin (Novatec PP FL02A, manufactured by Japan Polypropylene Corp.) was melt-extruded as a sealant resin to obtain a laminated body in which a sealant layer made of a polypropylene layer having a thickness of 30 μm was formed. In this case, the temperature of the polypropylene resin extruded from the T-die was 240° C.

From the laminated body, a specimen of 15 mm in width was sampled, and the peel strength of the specimen was measured by using a tensile tester (Intesco Precision Universal Material Tester, Model 2020, manufactured by Intesco Co., Ltd.), on the basis of the T-type peeling. The measurement was performed in an atmosphere of 20° C. and 65% RH, at a tensile rate of 50 mm/min. The peel strength is preferably 1.0 N/15 mm or more, more preferably 1.5 N/15 mm or more and furthermore preferably 2.0 N/15 mm or more.

(6) Adhesiveness (PE Resin)

A laminated body in which a sealant layer made of a polyethylene layer having a thickness of 30 μm was formed was obtained in the same manner as in foregoing (5) except that a polyethylene resin (Novatec LD LC600A, manufactured by Japan Polyethylene Corp.) was melt-extruded as a sealant resin on the surface of an adhesive layer. In this case, the temperature of the polyethylene resin extruded from the T-die was 290° C.

Subsequently, the peel strength was measured in the same manner as in foregoing (5).

(7) Moist Heat Resistance

The aqueous dispersion was applied to the corona treated surface of a biaxially stretched polyester film (Emblet S-50, thickness: 50 μm, manufactured by Unitika Ltd.) by using a Meyer bar so as for the application amount after drying to be approximately 5 g/m$^2$, and dried at 100° C. for 1 minute.

The coated surface of the coated film prepared in this way and the corona treated surface of a stretched polypropylene film (OP U-1, thickness: 50 manufactured by Mitsui Chemicals Tohcello, Ltd.) were bonded to each other, and pressed at 120° C. for 20 seconds under a pressure of 2 kg/cm$^2$ to obtain a laminated body.

The obtained laminated body was stored at 85° C. and 85% RH for 1000 hours, the peel strengths before and after the storage were measured, and the adhesion strength retention rate was calculated on the basis of the following formula:

Adhesion strength retention rate (%)=peel strength of laminated body after storage test/peel strength of laminated body before storage test The moist heat resistance was evaluated in terms of the obtained adhesion strength retention rate on the basis of the following four grades.

E (Excellent): Adhesion strength retention rate is 90% or more.

G (Good): Adhesion strength retention rate is 70% or more and less than 90%.

A (Average): Adhesion strength retention rate is 50% or more and less than 70%.

P (Poor): Adhesion strength retention rate is less than 50%.

It is to be noted that the peel strength was measured in the same manner as in foregoing (5). The peel strength is preferably 1.0 N/15 mm or more, more preferably 1.5 N/15 mm or more and furthermore preferably 2.0 N/15 mm or more.

(8) Transparency (Haze)

The aqueous dispersion was applied to the corona treated surface of a biaxially stretched polyester film (Emblet S-12, thickness: 12 μm, manufactured by Unitika Ltd.) by using a Meyer bar so as for the application amount after drying to be approximately 2 g/m$^2$, and dried at 100° C. for 1 minute to obtain a coated film.

The haze measurement of the coated film was performed on the basis of JIS K7361-1, by using a turbidity meter (NDH2000, manufactured by Nippon Denshoku Industries Co., Ltd.). It is to be noted that the evaluation value represents the haze value of the whole film prepared by coating the biaxially stretched polyester film having a haze value of 2.8%, used in Examples.

Production Example 1: Polyolefin Resin P-1

In a four-necked flask, in a nitrogen atmosphere, 280 g of a propylene-butene copolymer (mass ratio: propylene/1-butene=80/20) was heated and dissolved in 470 g of xylene, then 40.0 g of maleic anhydride as an unsaturated carboxylic acid and 28.0 g of dicumyl peroxide as a radical generator were respectively separately added to the xylene solution over 2 hours under stirring while the reaction system temperature was being maintained at 140° C., and then the reaction mixture was allowed to react for 6 hours. After completion of the reaction, the obtained reaction product was placed in a large amount of acetone to precipitate the resin.

The precipitated resin was once washed with an acetone solution of triethylamine (mass ratio: triethylamine/acetone=1/4) and then washed with acetone to remove the unreacted maleic anhydride, then the washed resin was dried under reduced pressure in a reduced-pressure dryer to yield a polyolefin resin P-1. The properties of the obtained resin are shown in Table 1.

Production Example 2: Polyolefin Resin P-2

A polyolefin resin P-2 was obtained by performing the same operations as in Production Example 1 except that a propylene-butene copolymer having a mass ratio of propylene/1-butene=65/35 was used in place of the propylene-butene copolymer adopted in Production Example 1.

Production Example 3: Polyolefin Resin P-3

A polyolefin resin P-3 was obtained by performing the same operations as in Production Example 1 except that a propylene-ethylene copolymer (mass ratio: propylene/ethylene=92/8) was used in place of the propylene-butene copolymer adopted in Production Example 1.

Production Example 4: Polyolefin Resin P-4

A polyolefin resin P-4 was obtained by performing the same operations as in Production Example 1 except that a propylene-butene-ethylene copolymer (mass ratio: propylene/1-butene/ethylene=65/24/11) was used in place of the propylene-butene copolymer adopted in Production Example 1.

Production Example 5: Polyolefin Resin P-5

A polyolefin resin P-5 was obtained by performing the same operations as in Production Example 1 except that the step of washing with acetone adopted in Production Example 1 was omitted.

Production Example 6: Polyolefin Resin P-6

A polyolefin resin P-6 was obtained by performing the same operations as in Production Example 1 except that the acetone solution of triethyl amine adopted in Production Example 1 was altered to acetone, and the subsequent washing with acetone adopted in Production Example 1 was altered to a washing with methanol.

Production Example 7: Polyolefin Resin P-7

A polyolefin resin P-7 was obtained by performing the same operations as in Production Example 1 except that the addition amount of maleic anhydride was altered to 70.0 g from 40.0 g adopted in Production Example 1, the addition amount of dicumyl peroxide was altered to 33.0 g from 28.0 g adopted in Production Example 1, and the steps of washing adopted in Production Example 1 were altered to a step of twice washing with acetone.

Production Example 8: Polyolefin Resin P-8

A polyolefin resin P-8 was obtained by performing the same operations as in Production Example 7 except that the washing step adopted in Production Example 7 was omitted.

Production Example 9: Polyolefin Resin P-9

A polyolefin resin P-9 was obtained by performing the same operations as in Production Example 1 except that the addition amount of maleic anhydride was altered to 24.0 g from 40.0 g adopted in Production Example 1, and the addition amount of dicumyl peroxide was altered to 18.5 g from 28.0 g adopted in Production Example 1.

Production Example 10: Polyolefin Resin P-10

A polyolefin resin P-10 was obtained by performing the same operations as in Production Example 3 except that the addition amount of maleic anhydride was alter to 56.0 g from 40.0 g adopted in Production Example 3, and the step of washing with a acetone solution of triethylamine and the step of washing with acetone adopted in Production Example 3 were omitted.

Production Example 11: Polyolefin Resin P-11

A polyolefin resin P-11 was obtained by performing the same operations as in Production Example 1 except that the addition amount of maleic anhydride was altered to 70.0 g from 40.0 g adopted in Production Example 1, the addition amount of dicumyl peroxide was altered to 20.0 g from 28.0 g adopted in Production Example 1, and the step of washing with a acetone solution of triethylamine and the step of washing with acetone in Production Example 1 were omitted.

Production Example 12: Polyolefin Resin P-12

A polyolefin resin P-12 was obtained by performing the same operations as in Production Example 3 except that the addition amount of maleic anhydride was altered to 70.0 g from 40.0 g adopted in Production Example 3, the addition amount of dicumyl peroxide was altered to 20.0 g adopted in Production Example 3, and the step of washing with a acetone solution of triethylamine and the step of washing with acetone in Production Example 3 were omitted.

Production Example 13: Polyolefin Resin P-13

A polyolefin resin P-13 was obtained by performing the same operations as in Production Example 1 except that a propylene-butene copolymer having a mass ratio of propylene/1-butene=97/3 was used in place of the propylene-butene copolymer in Production Example 1.

Production Example 14: Polyolefin Resin P-14

A polyolefin resin P-14 was obtained by performing the same operations as in Production Example 1 except that a propylene-butene copolymer having a mass ratio of propylene/1-butene=50/50 was used in place of the propylene-butene copolymer adopted in Production Example 1.

Production Example 15: Polyolefin Resin P-15

A polyolefin resin P-15 was obtained in the same method as in Production Example 1 except that the addition amount of maleic anhydride was altered to 2.0 g from 40.0 g adopted in Production Example 1, and the addition amount of dicumyl peroxide was altered to 1.4 g from 28.0 g adopted in Production Example 1.

Production Example 16: Polyolefin Resin P-16

In a four-necked flask, in a nitrogen atmosphere, 280 g of a propylene-butene copolymer (mass ratio: propylene/1-butene=80/20) was heated and dissolved in 470 g of chlorobenzene, then 9.5 g of maleic anhydride as an unsaturated carboxylic acid and 10.0 g of dicumyl peroxide as a radical generator were respectively separately added to the chlorobenzene solution over 2 hours under stirring while the reaction system temperature was being maintained at 130° C., and then the reaction mixture was allowed to react for 10 hours. After completion of the reaction, the obtained reaction product was placed in a large amount of acetone to precipitate the resin, and the resin was dried under reduced pressure in a reduced-pressure dryer to yield a polyolefin resin P-16.

Production Example 17: Polyolefin Resin P-17

On the basis of the methods described in G.B. Patent No. 2091745 B, U.S. Pat. No. 4,617,366 and U.S. Pat. No. 4,644,044, an ethylene-ethyl acrylate-maleic anhydride copolymer was prepared, the obtained copolymer was once washed with an acetone solution of triethylamine (mass ratio: triethylamine/acetone=1/4) and then washed with acetone to remove the unreacted maleic anhydride, and subsequently dried under reduced pressure in a reduced-pressure dryer to yield a polyolefin resin P-17.

The properties of the polyolefin resins obtained in Production Examples 1 to 17 are shown in Table 1.

TABLE 1

| Polyolefin resin | Composition of polyolefin resin | | | | | Properties | |
|---|---|---|---|---|---|---|---|
| | Olefin components (parts by mass) | | | Ethyl acrylate | Unsaturated carboxylic acid component (parts by mass[1)] | Content of unsaturated carboxylic acid monomer (ppm) | Weight average molecular weight |
| | Propylene (A) | Olefin(s) (B) other than propylene | | (parts by mass) | Maleic anhydride | | |
| | | 1-Butene | Ethylene | | | | |
| P-1 | 80 | 20 | 0 | 0 | 4.5 | 50 | 45,000 |
| P-2 | 65 | 35 | 0 | 0 | 4.0 | 97 | 50,000 |
| P-3 | 92 | 0 | 8 | 0 | 4.3 | 61 | 40,000 |
| P-4 | 65 | 24 | 11 | 0 | 4.1 | 88 | 47,000 |
| P-5 | 80 | 20 | 0 | 0 | 4.5 | 489 | 45,000 |
| P-6 | 80 | 20 | 0 | 0 | 4.5 | 934 | 43,000 |
| P-7 | 80 | 20 | 0 | 0 | 5.9 | 5,518 | 41,000 |
| P-8 | 80 | 20 | 0 | 0 | 5.9 | 9,960 | 40,000 |
| P-9 | 80 | 20 | 0 | 0 | 2.8 | 45 | 60,000 |
| P-10 | 92 | 0 | 8 | 0 | 5.1 | 9,260 | 70,000 |
| P-11 | 80 | 20 | 0 | 0 | 4.6 | 11,300 | 46,000 |
| P-12 | 92 | 0 | 8 | 0 | 4.5 | 11,900 | 42,000 |
| P-13 | 97 | 3 | 0 | 0 | 4.7 | 73 | 50,000 |
| P-14 | 50 | 50 | 0 | 0 | 4.1 | 43 | 50,000 |
| P-15 | 80 | 20 | 0 | 0 | 0.4 | 17 | 70,000 |
| P-16 | 80 | 20 | 0 | 0 | 1.5 | 3,648 | 65,000 |
| P-17 | 0 | 0 | 87 | 13 | 3.1 | 55 | Unmeasurable |

[1)]Parts by mass in relation to 100 parts by mass of the total amount of the propylene (A), the olefin(s) (B) other than propylene and ethyl acrylate.

Example 1

By using a stirrer equipped with a hermetically sealable, pressure-proof 1-liter volume glass vessel with a heater attached thereto, 60.0 g of the polyolefin resin P-1, 45.0 g of ethylene glycol n-butyl ether, 8.0 g of N,N-dimethylethanolamine (DMEA) and 137.0 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the reaction system temperature was being maintained at 160° C., the mixture was further stirred for 60 minutes.

Subsequently, the reaction system was cooled by air-cooling until the reaction system temperature reached 40° C., then the vessel was unsealed, and 40.0 g of isopropanol, 5.0 g of toluene and 30.0 g of distilled water were additionally placed in the vessel. Then, the vessel was sealed, the rotation speed of the stirrer blades was set at 300 rpm, and the resulting mixture was further heated for 60 minutes while the reaction system temperature was being maintained at 140° C.

Then, the mixture was cooled by air cooling down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.2 MPa) to yield a slightly cloudy aqueous dispersion E-1. In this case, there was almost no resin left on the filter.

Example 2

By using a stirrer equipped with a hermetically sealable, pressure-proof 1-liter volume glass vessel with a heater attached thereto, 60.0 g of the polyolefin resin P-1, 45.0 g of ethylene glycol n-butyl ether, 8.0 g of DMEA and 137.0 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the reaction system temperature was being maintained at 160° C., the mixture was further stirred for 60 minutes.

Subsequently, the reaction system was cooled by air-cooling until the reaction system temperature reached 80° C., then the vessel was unsealed, and 45.0 g of tetrahydrofuran, 5.0 g of DMEA and 30.0 g of distilled water were additionally placed in the vessel. Then, the vessel was sealed, the rotation speed of the stirrer blades was set at 300 rpm, and the resulting mixture was further heated for 60 minutes while the reaction system temperature was being maintained at 140° C.

Then, the mixture was cooled by air cooling down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.2 MPa) to yield a slightly cloudy aqueous dispersion E-2. In this case, there was almost no resin left on the filter.

Examples 3 to 4, 6 to 11, and 18

Aqueous dispersions E-3, E-4, E-6, E-7, E-8, E-9, E-10, E-11 and E-18 were obtained in Examples 3, 4, 6, 7, 8, 9, 10, 11 and 18, respectively, by performing the same operations as in Example 2 except that the polyolefin resins P-2, P-3, P-5, P-6, P-7, P-8, P-9, P-10 and P-16 were used in Examples 3, 4, 6, 7, 8, 9, 10, 11 and 18, respectively, in place of the polyolefin resin P-1 adopted in Example 2. It is to be noted that in Examples 8, 9 and 11, the amount of DMEA was set to be 12.0 g.

Example 5

An aqueous dispersion E-5 was obtained by performing the same operations as in Example 1 except that the polyolefin resin P-4 was used in place of the polyolefin P-1 adopted in Example 1 and the amount of DMEA was set to be 12.0 g.

Example 12

In a 0.5-liter two-necked round-bottom flask, 250 g of the aqueous dispersion E-2 obtained in Example 2 and 120 g of distilled water were placed, then the flask was equipped with a mechanical stirrer and a Liebig condenser, and the flask was heated in an oil bath to distil off the aqueous medium. When about 120 g of the aqueous medium was distilled off, the heating was terminated and the flask was cooled to room temperature. After cooling, the liquid components in the flask were filtered with a 300-mesh stainless steel filter (wire diameter: 0.035 mm, plain weave) under pressure (air pressure: 0.2 MPa) to yield a milky white aqueous polyolefin resin dispersion E-12.

Example 13

By using a stirrer equipped with a hermetically sealable, pressure-proof 1-liter volume glass vessel with a heater attached thereto, 60.0 g of the polyolefin resin P-1, 99.0 g of tetrahydrofuran, 11.6 g of DMEA and 159.4 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the reaction system temperature was being maintained at 130° C., the mixture was further stirred for 60 minutes.

Then, the mixture was cooled by air cooling down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.2 MPa) to yield a slightly cloudy aqueous dispersion E-13. In this case, there was almost no resin left on the filter.

Examples 14 to 16

Aqueous polyolefin resin dispersion E-14 to 16 were obtained by performing the same operations as in Example 13 except that the polyolefin resins P-2, P-3 and P-4 were used in Examples 14 to 16, respectively, in place of the polyolefin resin P-1 adopted in Example 13.

Example 17

In a 0.5-liter two-necked round-bottom flask, 250 g of the aqueous dispersion E-13 obtained in Example 13 and 120 g of distilled water were placed, then the flask was equipped with a mechanical stirrer and a Liebig condenser, and the flask was heated in an oil bath to distil off the aqueous medium. When about 120 g of the aqueous medium was distilled off, the heating was terminated and the flask was cooled to room temperature. After cooling, the liquid components in the flask were filtered with a 300-mesh stainless steel filter (wire diameter: 0.035 mm, plain weave) under pressure (air pressure: 0.2 MPa) to yield a milky white aqueous polyolefin resin dispersion E-17.

Example 19

An aqueous polyolefin resin dispersion was obtained by mixing the aqueous dispersion E-1 and an aqueous solution of an oxazoline group-containing compound (WS-700, solid content concentration: 25% by mass, manufactured by Nippon Shokubai Co., Ltd.) so as for the solid content amount of the oxazoline group-containing compound to be 10 parts by mass in relation to 100 parts by mass of the solid content of the olefin resin.

Examples 20 to 25

Aqueous polyolefin resin dispersions were obtained by performing the same operations as in Example 19 except that in place of the aqueous dispersion E-1 adopted in Example 19, the aqueous dispersions E-2, E-3, E-4, E-9, E-10 and E-11 were used in Examples 20 to 25, respectively. It is to be noted that in Example 24, the solid content amount of the oxazoline group-containing compound was set to be 5 parts by mass.

Example 26

An aqueous polyolefin resin dispersion was obtained by mixing the aqueous dispersion E-2 and an aqueous solution of a carbodiimide group-containing compound (Carbodilite V-02-L2, solid content concentration: 40% by mass, manufactured by Nisshinbo Chemical Inc.) so as for the solid content amount of the carbodiimide group-containing compound to be 30 parts by mass in relation to 100 parts by mass of the solid content of the olefin resin.

Example 27

An aqueous polyolefin resin dispersion was obtained by performing the same operations as in Example 26 except that the aqueous dispersion E-4 was used in place of the aqueous dispersion E-2 adopted in Example 26.

Example 28

An aqueous polyolefin resin dispersion was obtained by mixing the aqueous dispersion E-2 and a 10% by mass aqueous solution of an isocyanate group-containing compound (Basonat HW-100, manufactured by BASF Inc.) so as for the solid content amount of the isocyanate group-containing compound to be 25 parts by mass in relation to 100 parts by mass of the solid content of the olefin resin.

Example 29

An aqueous polyolefin resin dispersion was obtained by performing the same operations as in Example 28 except that the aqueous dispersion E-4 was used in place of the aqueous dispersion E-2 adopted in Examples 28.

Example 30

An aqueous polyolefin resin dispersion was obtained by mixing the aqueous dispersion E-2 and an aqueous solution of an epoxy group-containing compound (Adeka Resin EM-0517, solid content concentration: 51% by mass, epoxy equivalent: 730, manufactured by Adeka Corp.) so as for the solid content amount of the carbodiimide group-containing compound to be 35 parts by mass in relation to 100 parts by mass of the solid content of the olefin resin.

Example 31

A aqueous polyolefin resin dispersion was obtained by performing the same operations as in Example 30 except that the aqueous dispersion E-4 was used in place of the aqueous dispersion E-2 adopted in Example 30.

Example 32

An aqueous polyolefin resin dispersion was obtained by mixing the aqueous dispersion E-1 and an aqueous polyurethane resin dispersion liquid (Takerack W-6010, solid content concentration: 30% by mass, manufactured by Mitsui Chemicals, Inc.) so as for the solid content amount of the polyurethane resin to be 50 parts by mass in relation to 100 parts by mass of the solid content of the olefin resin.

Examples 33 to 35

An aqueous polyolefin resin dispersion was obtained by performing the same operations as in Example 32 except that the aqueous dispersions E-2, E-3 and E-4 were used in Examples 33 to 35, respectively, in place of the aqueous dispersion E-1 adopted in Example 32. It is to be noted that in Example 34, the solid content amount of the polyurethane resin was set to be 30 parts by mass.

Example 36

An aqueous polyolefin resin dispersion was obtained by mixing the aqueous dispersion E-2, the aqueous solution of the oxazoline group-containing compound and the aqueous solution of the carbodiimide group-containing compound so as for the solid content amount of the oxazoline group-containing compound to be 5 parts by mass and for the solid content amount of the carbodiimide group-containing compound to be 20 parts by mass in relation to 100 parts by mass of the solid content of the olefin resin.

Example 37

An aqueous polyolefin resin dispersion was obtained by mixing the aqueous dispersion E-1, the aqueous solution of the oxazoline group-containing compound and the aqueous polyurethane resin dispersion liquid so as for the solid content amount of the oxazoline group-containing compound to be 10 parts by mass and for the solid content amount of the polyurethane resin to be 50 parts by mass in relation to 100 parts by mass of the solid content of the olefin resin.

Example 38

An aqueous polyolefin resin dispersion was obtained by performing the same operations as in Example 37 except that the aqueous dispersion E-2 was used in place of the aqueous dispersion E-1 adopted in Example 37.

Comparative Examples 1 to 4

Aqueous dispersions E-19, E-20, E-21 and E-22 were obtained in Comparative Examples 1 to 4, respectively, by performing the same operations as in Example 2 except that the polyolefin resins P-11, P-12, P-13 and P-14 were used in Comparative Examples 1 to 4, respectively, in place of the polyolefin resin P-1 adopted in Example 2. It is to be noted that in Comparative Example 1, the amount of DMEA was set to be 12.0 g.

Comparative Example 5

An aqueous polyolefin resin dispersion was obtained by performing the same operations as in Example 19 except that the aqueous dispersion E-19 was used in place of the aqueous dispersion E-1 adopted in Example 19.

Comparative Example 6

The same operations as in Example 2 were performed except that the polyolefin resin P-15 was used in place of the polyolefin resin P-1 adopted in Example 2, and consequently, a large amount of the resin was identified on the filter. Accordingly, it is regarded that the polyolefin resin P-15 substantially did not undergo the progress of dispersion.

Reference Example 1

An aqueous dispersion E-23 was obtained by performing the preparation of the aqueous dispersion of a resin with a method according to Example 1 except that Noigen EA-190D (nonionic surfactant, manufactured by Dai-ichi Kogyo Seiyaku Co., Ltd.), which is a nonvolatile aqueous dispersing aid, was added so as to be 3% by mass in relation to the polyolefin resin.

Reference Example 2

In a 2-liter volume glass vessel equipped with a stirrer and a heater, 50 g of the polyolefin resin P-17, 150 g of n-propanol, 3 g of DMEA and 297 g of distilled water were placed. The resulting mixture was stirred by setting the rotation speed of the stirrer blades at 300 rpm, and consequently, no precipitate of the resin particulate was found at the vessel bottom, and the resin was verified to be in a suspended state. Then, while this state was being maintained, the mixture was heated after an elapsed time of 10 minutes by turning on the power source of the heater. Then, while the reaction system temperature was being maintained at 130° C., the mixture was further stirred for 120 minutes to prepare a dispersion. Subsequently, when the resulting dispersion was cooled to approximately 80° C. while the mixture was being stirred with the rotational speed still set at 300 rpm, the pressure inside the reaction system was gradually reduced, and n-propanol and water was removed. After removal of 300 g or more of n-propanol and water, when the reaction system temperature reached 35° C., water was added to the dispersion to regulate the concentration of the polyolefin resin in the aqueous dispersion to be 20% by mass, and the dispersion was filtered with a 180-mesh stainless steel filter under pressure to obtain an aqueous dispersion E-24.

In each of Examples 1 to 18, Comparative Examples 1 to 4 and Reference Examples 1 and 2, by using the apparatus unwashed after the preparation of aqueous dispersion, aqueous dispersions were continuously prepared further three times. The properties of the obtained aqueous dispersions are shown in Table 2.

TABLE 2

| | | Aqueous polyolefin resin dispersion | Polyolefin resin | First time production in continuous production | | | | | Second time production in continuous production | | | |
|---|---|---|---|---|---|---|---|---|---|---|---|---|
| | | | | Particle size (μm) | | Dispersity (mw/mn) | Viscosity (mPa·s) | Zeta potential (mV) | Particle size (μm) increase from first time | | Dispersity (mw/mn) | Viscosity (mPa·s) |
| | | | | mn | mw | | | | mn | mw | | |
| Examples | 1 | E-1 | P-1 | 0.060 | 0.140 | 2.33 | 15 | −42 | 0.001 | 0.001 | 2.31 | 15 |
| | 2 | E-2 | P-1 | 0.016 | 0.025 | 1.56 | 12 | −50 | 0.001 | 0.002 | 1.59 | 13 |
| | 3 | E-3 | P-2 | 0.012 | 0.015 | 1.25 | 10 | −38 | 0.003 | 0.005 | 1.33 | 10 |
| | 4 | E-4 | P-3 | 0.080 | 0.110 | 1.38 | 16 | −42 | 0.001 | 0.003 | 1.40 | 15 |
| | 5 | E-5 | P-4 | 0.092 | 0.130 | 1.41 | 11 | −40 | 0.002 | 0.003 | 1.41 | 11 |
| | 6 | E-6 | P-5 | 0.017 | 0.022 | 1.29 | 12 | −46 | 0.002 | 0.003 | 1.32 | 18 |
| | 7 | E-7 | P-6 | 0.016 | 0.024 | 1.50 | 14 | −44 | 0.002 | 0.004 | 1.56 | 19 |
| | 8 | E-8 | P-7 | 0.011 | 0.012 | 1.09 | 9 | −55 | 0.010 | 0.019 | 1.48 | 13 |
| | 9 | E-9 | P-8 | 0.010 | 0.012 | 1.20 | 10 | −53 | 0.007 | 0.016 | 1.65 | 15 |
| | 10 | E-10 | P-9 | 0.035 | 0.050 | 1.43 | 21 | −32 | 0.002 | 0.003 | 1.43 | 21 |
| | 11 | E-11 | P-10 | 0.083 | 0.120 | 1.45 | 15 | −48 | 0.007 | 0.015 | 1.50 | 23 |
| | 12 | E-12 | P-1 | 0.020 | 0.045 | 2.25 | 15 | −43 | 0.002 | 0.003 | 2.18 | 16 |
| | 13 | E-13 | P-1 | 0.042 | 0.070 | 1.67 | 10 | −39 | 0.000 | 0.002 | 1.71 | 10 |
| | 14 | E-14 | P-2 | 0.050 | 0.091 | 1.82 | 13 | −40 | 0.001 | 0.003 | 1.84 | 13 |
| | 15 | E-15 | P-3 | 0.060 | 0.108 | 1.80 | 14 | −42 | 0.001 | 0.002 | 1.80 | 14 |
| | 16 | E-16 | P-4 | 0.065 | 0.123 | 1.89 | 14 | −40 | 0.002 | 0.004 | 1.90 | 15 |
| | 17 | E-17 | P-1 | 0.043 | 0.081 | 1.88 | 12 | −40 | 0.000 | 0.001 | 1.91 | 12 |
| | 18 | E-18 | P-16 | 0.047 | 0.092 | 1.96 | 18 | −38 | 0.000 | 0.003 | 2.02 | 19 |
| Comparative Examples | 1 | E-19 | P-11 | 0.034 | 0.053 | 1.56 | 19 | −41 | 0.020 | 0.035 | 1.63 | 35 |
| | 2 | E-20 | P-12 | 0.090 | 0.145 | 1.61 | 21 | −39 | 0.038 | 0.050 | 1.52 | 41 |
| | 3 | E-21 | P-13 | 0.080 | 0.220 | 2.75 | 20 | −45 | 0.001 | 0.003 | 2.75 | 22 |
| | 4 | E-22 | P-14 | 0.070 | 0.200 | 2.86 | 18 | −44 | 0.000 | 0.001 | 2.87 | 17 |
| Reference Example 1 | | E-23 | P-1 | 0.055 | 0.150 | 2.73 | 11 | −65 | 0.000 | 0.000 | 2.73 | 11 |
| Reference Example 2 | | E-24 | P-17 | 0.042 | 0.080 | 1.90 | 17 | −42 | 0.000 | 0.001 | 1.93 | 17 |

| | | Third time production in continuous production | | | | Fourth time production in continuous production | | | |
|---|---|---|---|---|---|---|---|---|---|
| | | Particle size (μm) increase from first time | | Dispersity (mw/mn) | Viscosity (mPa·s) | Particle size (μm) increase from first time | | Dispersity (mw/mn) | Viscosity (mPa·s) |
| | | mn | mw | | | mn | mw | | |
| Examples | 1 | 0.001 | 0.002 | 2.33 | 14 | 0.002 | 0.004 | 2.32 | 15 |
| | 2 | 0.002 | 0.002 | 1.50 | 11 | 0.002 | 0.005 | 1.67 | 12 |
| | 3 | 0.004 | 0.007 | 1.38 | 10 | 0.007 | 0.012 | 1.42 | 12 |
| | 4 | 0.002 | 0.003 | 1.38 | 16 | 0.005 | 0.007 | 1.38 | 16 |
| | 5 | 0.004 | 0.006 | 1.42 | 12 | 0.009 | 0.014 | 1.43 | 11 |
| | 6 | 0.002 | 0.004 | 1.37 | 23 | 0.004 | 0.007 | 1.38 | 23 |
| | 7 | 0.003 | 0.007 | 1.63 | 25 | 0.005 | 0.011 | 1.67 | 31 |
| | 8 | 0.014 | 0.035 | 1.88 | 19 | 0.022 | 0.052 | 1.94 | 23 |
| | 9 | 0.033 | 0.067 | 1.84 | 22 | 0.039 | 0.098 | 2.24 | 35 |
| | 10 | 0.002 | 0.003 | 1.43 | 21 | 0.005 | 0.008 | 1.45 | 22 |
| | 11 | 0.029 | 0.054 | 1.55 | 31 | 0.035 | 0.092 | 1.80 | 46 |
| | 12 | 0.002 | 0.004 | 2.23 | 15 | 0.003 | 0.010 | 2.39 | 15 |
| | 13 | 0.001 | 0.004 | 1.72 | 10 | 0.003 | 0.007 | 1.71 | 11 |
| | 14 | 0.001 | 0.003 | 1.84 | 13 | 0.002 | 0.006 | 1.87 | 13 |
| | 15 | 0.001 | 0.003 | 1.82 | 15 | 0.002 | 0.005 | 1.82 | 15 |
| | 16 | 0.002 | 0.005 | 1.91 | 15 | 0.002 | 0.005 | 1.91 | 15 |
| | 17 | 0.001 | 0.003 | 1.91 | 13 | 0.001 | 0.005 | 1.95 | 14 |
| | 18 | 0.002 | 0.007 | 2.02 | 18 | 0.004 | 0.011 | 2.02 | 20 |
| Comparative Examples | 1 | 0.058 | 0.105 | 1.72 | 67 | 0.065 | 0.152 | 2.07 | 102 |
| | 2 | 0.090 | 0.136 | 1.56 | 73 | 0.091 | 0.189 | 1.85 | 104 |
| | 3 | 0.002 | 0.004 | 2.73 | 21 | 0.006 | 0.014 | 2.72 | 23 |
| | 4 | 0.001 | 0.003 | 2.86 | 19 | 0.002 | 0.007 | 2.88 | 20 |

TABLE 2-continued

| | | | | | | | | |
|---|---|---|---|---|---|---|---|---|
| Reference Example 1 | 0.000 | 0.02 | 3.09 | 12 | 0.001 | 0.003 | 2.73 | 12 |
| Reference Example 2 | 0.001 | 0.002 | 1.91 | 17 | 0.001 | 0.003 | 1.93 | 17 |

As shown in Table 2, in each of Examples 1 to 18 each of which used the polyolefin resin having a content of the unsaturated carboxylic acid monomer falling within the range specified in the present invention, the increase of the weight average particle size of the polyolefin resin was suppressed, the increase of the viscosity of the aqueous dispersion was suppressed, and the continuous production of the aqueous dispersion was made possible. In particular, as the content of the unsaturated carboxylic acid monomer was decreased within the range specified in the present invention, the suppression effect of the increase of the weight average particle size of the polyolefin resin and the suppression effect of the increase of the viscosity of the aqueous dispersion became remarkable, and when the content of the unsaturated carboxylic acid monomer was set to be 5,000 ppm or less, a particularly remarkable effect was found.

On the other hand, in each of Comparative Examples 1 and 2, in the course of the continuous production of the aqueous dispersions without washing the apparatus, as the number of times of the production was increased, the increase of the weight average particle size of the polyolefin resin or the increase of the viscosity of the aqueous dispersion occurred, stable properties of the aqueous dispersion were not obtained, and the continuous industrial production became difficult.

Tables 3 and 4 show the evaluation results of the aqueous dispersions obtained in Examples 1 to 38, Comparative Examples 1 to 5 and Reference Examples 1 and 2, and the evaluations results of the coating films obtained from the aqueous dispersions.

TABLE 3

| | | Aqueous polyolefin resin dispersion | | | | | | | Properties of coating film | | | |
|---|---|---|---|---|---|---|---|---|---|---|---|---|
| | | | | Constitution | | | | | | Adhesiveness | | Water resistance |
| | | | | Contents of additives (parts by mass*) | | | | | Content of unsaturated carboxylic acid monomer in dry residue (ppm) | Number of remaining sections in cross-cut adhesion test | | Number of remaining sections in cross-cut adhesion test |
| | | | Functional groups contained in cross-linking agent | | | | | | | | | |
| | | Aqueous dispersion | Oxazoline group | Carbodiimide group | Isocyanate group | Epoxy group | Polyurethane resin | | | Mixing stability | Evaluation | |
| Examples | 1 | E-1 | — | — | — | — | — | 49 | G | 100 | E | 100 |
| | 2 | E-2 | — | — | — | — | — | 52 | G | 100 | E | 100 |
| | 3 | E-3 | — | — | — | — | — | 98 | G | 100 | E | 100 |
| | 4 | E-4 | — | — | — | — | — | 59 | G | 95 | G | 95 |
| | 5 | E-5 | — | — | — | — | — | 90 | G | 98 | G | 98 |
| | 6 | E-6 | — | — | — | — | — | 492 | G | 100 | E | 100 |
| | 7 | E-7 | — | — | — | — | — | 932 | G | 100 | E | 100 |
| | 8 | E-8 | — | — | — | — | — | 5,520 | G | 100 | E | 97 |
| | 9 | E-9 | — | — | — | — | — | 9,955 | G | 100 | E | 91 |
| | 10 | E-10 | — | — | — | — | — | 45 | G | 100 | E | 100 |
| | 11 | E-11 | — | — | — | — | — | 9,244 | G | 95 | G | 92 |
| | 12 | E-12 | — | — | — | — | — | 48 | G | 100 | E | 100 |
| | 13 | E-13 | — | — | — | — | — | 50 | G | 100 | E | 100 |
| | 14 | E-14 | — | — | — | — | — | 100 | G | 100 | E | 100 |
| | 15 | E-15 | — | — | — | — | — | 59 | G | 96 | G | 96 |
| | 16 | E-16 | — | — | — | — | — | 87 | G | 98 | G | 98 |
| | 17 | E-17 | — | — | — | — | — | 48 | G | 100 | E | 100 |
| | 18 | E-18 | — | — | — | — | — | 3,647 | G | 100 | E | 100 |
| | 19 | E-1 | 10 | — | — | — | — | 46 | G | 100 | E | 100 |
| | 20 | E-2 | 10 | — | — | — | — | 45 | G | 100 | E | 100 |
| | 21 | E-3 | 10 | — | — | — | — | 85 | G | 100 | E | 100 |
| | 22 | E-4 | 10 | — | — | — | — | 57 | G | 98 | G | 98 |
| | 23 | E-9 | 10 | — | — | — | — | 9,083 | G | 100 | E | 96 |
| | 24 | E-10 | 5 | — | — | — | — | 44 | G | 100 | E | 100 |
| | 25 | E-11 | 10 | — | — | — | — | 8,407 | G | 97 | G | 95 |

TABLE 3-continued

| | | | | Properties of coating film | | | | | | | | |
|---|---|---|---|---|---|---|---|---|---|---|---|---|
| | | | Chemical resistance | | Low-temperature film formability | | | Adhesiveness Peel strength (N/15 mm) | | Moist heat resistance | | |
| | | Water resistance | | | | | | | | Peel strength (N/15 mm) | | Evaluation of |
| | | Evaluation | Exterior appearance | Number of remaining sections in cross-cut adhesion test | Evaluation | Exterior appearance | Number of remaining sections in cross-cut adhesion test | Evaluation | PP extrusion | PE extrusion | Before test | After test | retention rate | Haze (%) |

| | | Evaluation | Exterior appearance | adhesion test | Evaluation | appearance | adhesion test | Evaluation | PP extrusion | PE extrusion | Before test | After test | retention rate | Haze (%) |
|---|---|---|---|---|---|---|---|---|---|---|---|---|---|---|
| Examples | 1 | E | G | 99 | G | G | 93 | A | 6.7 | 0.8 | 2.7 | 2.3 | G | 13.6 |
| | 2 | E | G | 99 | G | G | 100 | E | 6.9 | 1.0 | 3.3 | 2.8 | G | 4.0 |
| | 3 | E | G | 98 | G | G | 100 | E | 7.1 | 1.0 | 3.5 | 2.9 | G | 3.2 |
| | 4 | G | G | 93 | A | G | 91 | A | 1.0 | 1.8 | 2.8 | 2.3 | G | 8.3 |
| | 5 | G | G | 95 | G | G | 91 | A | 1.5 | 1.9 | 2.9 | 2.4 | G | 12.5 |
| | 6 | E | G | 98 | G | G | 100 | E | 7.0 | 0.9 | 2.8 | 2.2 | G | 3.6 |
| | 7 | E | G | 98 | G | G | 100 | E | 7.2 | 0.9 | 2.5 | 2.0 | G | 3.7 |
| | 8 | G | G | 93 | A | G | 100 | E | 7.0 | 0.7 | 3.1 | 1.8 | A | 3.0 |
| | 9 | A | G | 90 | A | G | 100 | E | 6.8 | 0.5 | 3.0 | 1.6 | A | 3.0 |
| | 10 | E | G | 98 | G | G | 100 | E | 7.2 | 0.8 | 2.5 | 2.1 | G | 4.9 |
| | 11 | A | G | 90 | A | G | 90 | A | 1.0 | 1.5 | 2.9 | 1.5 | A | 11.2 |
| | 12 | E | G | 97 | G | G | 100 | E | 7.1 | 1.1 | 3.0 | 2.6 | G | 4.4 |
| | 13 | E | G | 99 | G | G | 100 | E | 6.9 | 1.0 | 2.9 | 2.5 | G | 6.4 |
| | 14 | E | G | 99 | G | G | 100 | E | 7.2 | 0.9 | 3.2 | 2.6 | G | 7.4 |
| | 15 | G | G | 94 | A | G | 91 | A | 1.1 | 1.8 | 3.3 | 2.6 | G | 8.6 |
| | 16 | G | G | 95 | G | G | 93 | A | 1.6 | 2.0 | 3.0 | 2.3 | G | 10.4 |
| | 17 | E | G | 99 | G | G | 100 | E | 7.3 | 1.0 | 3.0 | 2.5 | G | 6.7 |
| | 18 | E | G | 97 | G | G | 100 | E | 7.0 | 0.8 | 3.4 | 2.8 | G | 4.3 |
| | 19 | E | G | 100 | E | G | 95 | G | 8.1 | 1.4 | 8.1 | 7.1 | G | 13.8 |
| | 20 | E | G | 100 | E | G | 100 | E | 8.6 | 1.5 | 8.5 | 8.5 | E | 4.1 |
| | 21 | E | G | 100 | E | G | 100 | E | 8.5 | 1.4 | 8.4 | 8.2 | E | 3.2 |
| | 22 | G | G | 97 | G | G | 92 | A | 1.2 | 2.5 | 8.0 | 6.8 | G | 8.5 |
| | 23 | G | G | 96 | G | G | 100 | E | 7.9 | 1.2 | 7.3 | 6.0 | G | 3.1 |
| | 24 | E | G | 100 | E | G | 100 | E | 8.3 | 1.4 | 6.8 | 6.2 | E | 4.9 |
| | 25 | G | G | 92 | A | G | 93 | A | 1.2 | 2.3 | 5.3 | 3.9 | G | 11.4 |

*Parts by mass in relation to 100 parts by mass of polyolefin resin of aqueous dispersion

TABLE 4

| | | Aqueous polyolefin resin dispersion | | | | | | | | Properties of coating film | | |
|---|---|---|---|---|---|---|---|---|---|---|---|---|
| | | Constitution | | | | | | Content of unsaturated carboxylic acid monomer in dry residue (ppm) | Mixing stability | Adhesiveness | | Water resistance |
| | | | Contents of additives (parts by mass*) | | | | | | | Number of remaining sections in cross-cut adhesion test | Evaluation | Number of remaining sections in cross-cut adhesion test |
| | | | Functional groups contained in cross-linking agent | | | | | | | | | |
| | | Aqueous dispersion | Oxazoline group | Carbodiimide group | Isocyanate group | Epoxy group | Polyurethane resin | | | | | |
| Examples | 26 | E-2 | — | 30 | — | — | — | 36 | G | 100 | E | 100 |
| | 27 | E-4 | — | 30 | — | — | — | 47 | G | 96 | G | 96 |
| | 28 | E-2 | — | — | 25 | — | — | 41 | G | 100 | E | 100 |
| | 29 | E-4 | — | — | 25 | — | — | 51 | G | 96 | G | 96 |
| | 30 | E-2 | — | — | — | 35 | — | 37 | G | 100 | E | 100 |
| | 31 | E-4 | — | — | — | 35 | — | 43 | G | 97 | G | 96 |
| | 32 | E-1 | — | — | — | — | 50 | 30 | G | 100 | E | 100 |
| | 33 | E-2 | — | — | — | — | 50 | 35 | G | 100 | E | 100 |
| | 34 | E-3 | — | — | — | — | 30 | 77 | G | 100 | E | 100 |
| | 35 | E-4 | — | — | — | — | 50 | 40 | G | 96 | G | 95 |
| | 36 | E-2 | 5 | 20 | — | — | — | 38 | G | 100 | E | 100 |
| | 37 | E-1 | 10 | — | — | — | 50 | 31 | G | 100 | E | 100 |
| | 38 | E-2 | 10 | — | — | — | 50 | 33 | G | 100 | E | 100 |

TABLE 4-continued

| | | | | | | | | | | | | | |
|---|---|---|---|---|---|---|---|---|---|---|---|---|---|
| Comparative Examples | 1 | E-19 | — | — | — | — | — | 11,310 | G | 92 | A | 72 | |
| | 2 | E-20 | — | — | — | — | — | 11,925 | G | 90 | A | 65 | |
| | 3 | E-21 | — | — | — | — | — | 70 | P | 94 | A | 45 | |
| | 4 | E-22 | — | — | — | — | — | 45 | A | 48 | P | 29 | |
| | 5 | E-19 | 10 | — | — | — | — | 10,251 | G | 96 | G | 93 | |
| Reference Example | 1 | E-23 | — | — | — | — | — | 51 | G | 3 | P | Coating film exfoliation | |
| | 2 | E-24 | — | — | — | — | — | 54 | G | 88 | P | 75 | |

Properties of coating film

| | | Water resistance | | Chemical resistance | | Low-temperature film formability | | | Adhesiveness Peel strength (N/15 mm) | | Moist heat resistance | | | |
|---|---|---|---|---|---|---|---|---|---|---|---|---|---|---|
| | | | | Number of remaining sections in cross-cut | | | Number of remaining sections in cross-cut | | | | Peel strength (N/15 mm) | | Evaluation of retention rate | Haze (%) |
| | | Evaluation | Exterior appearance | adhesion test | Evaluation | Exterior appearance | adhesion test | Evaluation | PP extrusion | PE extrusion | Before test | After test | | |
| Examples | 26 | E | G | 100 | E | G | 100 | E | 8.4 | 1.5 | 8.3 | 8.2 | E | 3.2 |
| | 27 | G | G | 94 | A | G | 92 | A | 1.2 | 2.4 | 7.9 | 6.5 | G | 8.7 |
| | 28 | E | G | 100 | E | G | 100 | E | 8.2 | 1.5 | 6.2 | 6.1 | E | 3.3 |
| | 29 | G | G | 93 | A | G | 91 | A | 1.1 | 2.3 | 5.4 | 4.2 | G | 8.9 |
| | 30 | E | G | 100 | E | G | 100 | E | 8.2 | 1.7 | 6.6 | 6.4 | E | 3.2 |
| | 31 | G | G | 94 | A | G | 93 | A | 1.1 | 2.6 | 6.1 | 5.0 | G | 8.7 |
| | 32 | E | G | 100 | E | G | 96 | G | 8.5 | 1.8 | 7.6 | 6.4 | G | 13.7 |
| | 33 | E | G | 100 | E | G | 100 | E | 8.6 | 1.9 | 8.1 | 7.9 | E | 4.0 |
| | 34 | E | G | 100 | E | G | 100 | E | 8.5 | 1.8 | 7.8 | 7.5 | E | 3.3 |
| | 35 | G | G | 93 | A | G | 95 | G | 1.1 | 2.9 | 7.8 | 6.7 | G | 8.6 |
| | 36 | E | G | 100 | E | G | 100 | E | 8.3 | 1.6 | 8.4 | 8.0 | E | 3.4 |
| | 37 | E | G | 100 | E | G | 100 | E | 8.0 | 1.9 | 8.3 | 7.3 | G | 13.8 |
| | 38 | E | G | 100 | E | G | 100 | E | 8.2 | 2.0 | 8.8 | 8.7 | E | 4.1 |
| Comparative Examples | 1 | P | A | 69 | P | A | 77 | P | 6.6 | 0.9 | 2.4 | Delamination | P | 5.6 |
| | 2 | P | A | 63 | P | A | 59 | P | 0.9 | 1.5 | 2.3 | Delamination | P | 15.3 |
| | 3 | P | A | 33 | P | A | 30 | P | 5.8 | 0.6 | 1.4 | 0.2 | P | 17.1 |
| | 4 | P | A | 16 | P | A | 27 | P | 1.8 | 0.9 | 1.1 | 0.1 | P | 17.9 |
| | 5 | A | A | 88 | P | A | 80 | P | 7.9 | 1.2 | 7.8 | 4.0 | A | 5.7 |
| Reference Example | 1 | P | P | Coating film exfoliation | P | P | 0 | P | Delamination | Delamination | 1.5 | Delamination | P | 14.4 |
| | 2 | P | A | 63 | P | A | 84 | P | 0.1 | 5.2 | 1.7 | 1.4 | G | 5.8 |

*Parts by mass in relation to 100 parts by mass of polyolefin resin of aqueous dispersion As shown in Tables 3 and 4, the aqueous polyolefin resin dispersions of the present invention obtained in Examples 1 to 38 were each excellent in the mixing stability with the carbon black dispersion and the low-temperature film formability, and the coating films obtained from the aqueous dispersions were each excellent in the adhesiveness to the PP substrate, and in the water resistance and chemical resistance of the coating film.

In particular, as the content of the unsaturated carboxylic acid monomer was decreased within the range specified in the present invention, the water resistance and the chemical resistance of the coating film became more excellent, and when the content of the unsaturated carboxylic acid monomer was set to be 5,000 ppm or less, a particularly remarkable effect was found.

The laminated bodies prepared by forming an adhesive layer by using the aqueous polyolefin resin dispersion of the present invention and by the extrusion lamination of the polypropylene resin exhibited excellent adhesiveness, and in particular, when the butene component was included as the polyolefin component, the laminated bodies exhibited remarkable adhesiveness.

In the cases where a cross-linking agent or polyurethane resin was added to the aqueous polyolefin resin dispersion of the present invention (Example 19 to 38), coating films more excellent in chemical resistance and moist heat resistance were obtained, and in particular, when the particle size of the aqueous dispersion was 0.05 μm or less, the low-temperature film formability, the effects caused by the addition of the additives, and the transparency were remarkably high.

On the other hand, in the cases where the content of the unsaturated carboxylic acid monomer in the dry residue of the aqueous polyolefin resin dispersion exceeded the range specified in the present invention (Comparative Examples 1 and 2), the aqueous dispersions were poor in the low-temperature film formability, and the obtained coating films were poor in water resistance, chemical resistance and moist heat resistance. In addition, even when the additives were added, a coating film having a sufficient chemical resistance and a sufficient moist heat resistance was not obtained (Comparative Example 5).

When the mass ratio (A/B) between the propylene (A) and the olefin(s) (B) other than propylene, constituting the polyolefin resin was outside the range specified in the present invention (Comparative Examples 3 and 4), the mixing stability with the carbon black dispersion, the low-temperature film formability on the PP substrate and the adhesiveness to the PP substrate, the water resistance, the chemical resistance and the moist heat resistance were poor. Moreover, in Comparative Example 6 using the polyolefin resin having a content of the unsaturated carboxylic acid component falling outside the range specified in the present invention, dispersion was not substantially allowed to proceed, and accordingly no aqueous dispersion was able to be obtained.

In Reference Example 1, although the resin composition and the particle size were nearly the same as those in Example 1, and there was no particular problem with respect to the stability as an aqueous dispersion, because a nonvolatile aqueous dispersing aid was used, for example, the water resistance of the coating film and the adhesiveness of the coating film to the PP substrate were degraded.

In Reference Example 2, in the case where a conventionally known aqueous polyolefin resin dispersion was used, when extrusion lamination was performed on the adhesive layer formed by using the aqueous dispersion, the laminated body prepared by extruding the polyethylene resin was excellent in adhesiveness, but the laminated body prepared by extruding the polypropylene resin did not exhibit any adhesiveness at all. In addition, because this aqueous dispersion was poor in the adhesiveness to the polypropylene resin substrate, the obtained coating film was also poor in the evaluations of water resistance and chemical resistance.

The invention claimed is:

1. An aqueous polyolefin resin dispersion comprising a polyolefin resin and an aqueous medium, wherein
    the aqueous polyolefin resin dispersion does not include water-soluble polymers;
    the polyolefin resin includes an olefin component and an unsaturated carboxylic acid component as copolymer components and is not bonded to water-soluble polymers;
    the olefin component includes propylene (A) and an olefin(s) (B) other than propylene and does not include ethylene;
    a mass ratio (A/B) between the propylene (A) and the olefin(s) (B) other than propylene is 60/40 to 95/5;
    a content of the unsaturated carboxylic acid component as the copolymer component is 1 part by mass or more in relation to 100 parts by mass of a total mass of the propylene (A) and the olefin(s) (B) other than propylene; and
    a content of an unsaturated carboxylic acid monomer in a dry residue of the aqueous dispersion is 10,000 ppm or less.

2. The aqueous polyolefin resin dispersion according to claim 1, wherein the olefin(s) (B) other than propylene is butene.

3. The aqueous polyolefin resin dispersion according to claim 1, further comprising a cross-linking agent and/or a polyurethane resin.

4. An aqueous dispersion-containing material selected from a coating agent, a primer, a coating material, an ink and an adhesive, wherein the aqueous dispersion-containing material includes the aqueous polyolefin resin dispersion according to claim 1.

5. A coating film obtained from the aqueous polyolefin resin dispersion according to claim 1.

6. The aqueous polyolefin resin dispersion according to claim 2, further comprising a cross-linking agent and/or a polyurethane resin.

7. An aqueous dispersion-containing material selected from a coating agent, a primer, a coating material, an ink and an adhesive, wherein the aqueous dispersion-containing material includes the aqueous polyolefin resin dispersion according to claim 2.

8. An aqueous dispersion-containing material selected from a coating agent, a primer, a coating material, an ink and an adhesive, wherein the aqueous dispersion-containing material includes the aqueous polyolefin resin dispersion according to claim 3.

9. An aqueous dispersion-containing material selected from a coating agent, a primer, a coating material, an ink and an adhesive, wherein the aqueous dispersion-containing material includes the aqueous polyolefin resin dispersion according to claim 6.

10. A coating film obtained from the aqueous polyolefin resin dispersion according to claim 2.

11. A coating film obtained from the aqueous polyolefin resin dispersion according to claim 3.

12. A coating film obtained from the aqueous polyolefin resin dispersion according to claim 6.

* * * * *